United States Patent
Katsavounidis

(10) Patent No.: US 12,418,687 B2
(45) Date of Patent: Sep. 16, 2025

(54) OPTIMIZING ENCODING OPERATIONS WHEN GENERATING A BUFFER-CONSTRAINED VERSION OF A MEDIA TITLE

(71) Applicant: NETFLIX, INC., Los Gatos, CA (US)

(72) Inventor: Ioannis Katsavounidis, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 17/164,548

(22) Filed: Feb. 1, 2021

(65) Prior Publication Data
US 2021/0160550 A1    May 27, 2021

Related U.S. Application Data

(63) Continuation of application No. 16/244,033, filed on Jan. 9, 2019, now Pat. No. 10,911,791.

(51) Int. Cl.
*H04N 21/231* (2011.01)
*H04N 21/235* (2011.01)
(Continued)

(52) U.S. Cl.
CPC ......... *H04N 21/231* (2013.01); *H04N 21/235* (2013.01); *H04N 21/236* (2013.01); *H04N 21/2662* (2013.01)

(58) Field of Classification Search
CPC .. H04N 21/231; H04N 21/235; H04N 21/236; H04N 21/2662
See application file for complete search history.

(56) References Cited

U.S. PATENT DOCUMENTS

| 8,837,601 B2 | 9/2014 | Ronca et al. |
| 2004/0165783 A1 | 8/2004 | Reynolds et al. |

(Continued)

FOREIGN PATENT DOCUMENTS

| CN | 103621085 A | 3/2014 |
| CN | 107145888 A | 9/2017 |

(Continued)

OTHER PUBLICATIONS

Jan De Cock et al., Complexity-based consistent-quality encoding in the cloud, Sep. 1, 2016, 2016 IEEE International Conference on Image Processing (ICIP) (pp. 1484-1488) (Year: 2016).*

(Continued)

*Primary Examiner* — Hesham K Abouzahra
(74) *Attorney, Agent, or Firm* — Artegis Law Group, LLP

(57) ABSTRACT

In various embodiments, a buffer-based encoding application generates a first convex hull of subsequence encode points based on multiple encoding points and a first subsequence associated with a media title. The buffer-based encoding application then generates a first global convex hull of media encode points based on a transmission buffer constraint, the first convex hull, and a second global convex hull of media encode points. Notably, the second global convex hull is associated with a portion of the media title that occurs before the first subsequence in a playback order for the media title. Subsequently, the subsequence-based encoding application selects a first media encode point included in the first global convex hull based on a media metric and determines a first encoded media sequence based on the selected media encode point. The first encoded media sequence is subsequently streamed to an endpoint device during playback of the media title.

21 Claims, 10 Drawing Sheets

(51) Int. Cl.
  *H04N 21/236* (2011.01)
  *H04N 21/2662* (2011.01)

(56) References Cited

U.S. PATENT DOCUMENTS

| | | | |
|---|---|---|---|
| 2007/0002946 A1 | 1/2007 | Bouton et al. | |
| 2011/0019974 A1* | 1/2011 | Konoshima | G11B 27/036 |
| | | | 386/E5.028 |
| 2011/0052087 A1 | 3/2011 | Mukherjee | |
| 2011/0090949 A1 | 4/2011 | Gu | |
| 2013/0223510 A1 | 8/2013 | Coudurier et al. | |
| 2013/0329781 A1 | 12/2013 | Su et al. | |
| 2016/0254976 A1* | 9/2016 | Hayashi | H04L 43/0894 |
| | | | 370/252 |
| 2016/0295254 A1 | 10/2016 | Chen et al. | |
| 2017/0064342 A1* | 3/2017 | Botsford | H04N 21/2381 |
| 2017/0264820 A1* | 9/2017 | Shibayama | H04N 19/15 |
| 2018/0063549 A1 | 3/2018 | Amer et al. | |
| 2018/0302456 A1 | 10/2018 | Katsavounidis et al. | |
| 2018/0343458 A1 | 11/2018 | Katsavounidis et al. | |

FOREIGN PATENT DOCUMENTS

| | | | |
|---|---|---|---|
| CN | 108965930 A | 12/2018 | |
| WO | WO-2005029868 A1 * | 3/2005 | H04N 19/102 |
| WO | 2018/156997 A1 | 8/2018 | |

OTHER PUBLICATIONS

Complexity-Based Consistent-Quality Encoding in the Cloud (Year: 2016).*

Zhang et al., "Rate control optimization for live streaming using fixed-lime playback buffer", Soft Computing, DOI:10.1007/S00500-015-1854-7, vol. 21, No. 5, Sep. 23, 2015, pp. 1219-1228.

Wiegand et al., "Overview of the H.264/AVC Video Coding Standard", DOI:10.1109/TCSVT.2003.815165, IEEE Transactions on Circuits and Systems for Video Technology, vol. 13, No. 7, Jul. 2003, pp. 560-576.

"The Netflix Tech Blog: High Quality Video Encoding at Scale", Retrieved on May 19, 2020, https://nelflixtechblog.com/high-quality-video-encoding-at-scale-d159db052746, Dec. 9, 2015, 6 pages.

Ortega et al., "Rate-Distortion Methods for Image and Video Compression", IEEE Signal Processing Magazine, vol. 15, No. 6, Nov. 1998, pp. 23-50.

Richardson, Iain E.G., "H. 264 and MPEG-4 Video Compression Video Coding for Next-generation Multimedia", John Wiley & Sons, 2003, 307 pages.

Keys, Robert G., "Cubic Convolution Interpolation for Digital Image Processing", IEEE Transactions on Acoustics, Speech, and Signal Processing, vol. ASSP-29, No. 6, Dec. 1981, pp. 1153-1160.

"Lanczos resampling—Wikipedia", Retrieved on May 19, 2020, http://en.wikipedia.org/wiki/Lanczos_resampling, 5 pages.

"The Netflix Tech Blog: Per-Title Encode Optimization", Retrieved on May 19, 2020, https://nelflixtechblog.com/per-title-encode-optimization-7e99442b62a2, Dec. 14, 2015, 13 pages.

"The Netflix Tech Blog: Toward A Practical Perceptual Video Quality Metric", Retrieved on May 19, 2020, https://netflixtechblog.com/toward-a-practical-perceptual-video-quality-metric-653f208b9652, Jun. 6, 2016, 21 pages.

"X264—Wikipedia", Retrieved on May 19, 2020, https://en.wikipedia.org/wiki/X264, 5 pages.

Tavakoli et al., "Quality of experience of adaptive video streaming: Investigation in service parameters and subjective quality assessment methodology", doi.org/10.1016/j.image.2015.05.001, Signal Processing: Image Communication, vol. 39, 2015, pp. 1-12.

Katsavounidis, Ioannis, "Netflix-"El Fuente" video sequence details and scenes", http://www.cdvl.org/documents/ElFuente_summary.pdf, Jul. 28, 2015, 64 pages.

Sullivan et al., "Rate-Distortion Optimization for Video Compression", IEEE Signal Processing Magazine, vol. 15, No. 6, Nov. 1998, pp. 74-90.

Thiede et al., "PEAQ—The ITU Standard for Objective Measurement of Perceived Audio Quality", Journal of the Audio Engineering Society, vol. 48, No. 1/2, Jan./Feb. 2000, pp. 3-29.

The Consumer Digital Video Library, Retrieved on May 19, 2020, http://www.cdvl.org, 1 page.

Katsavounidis et al., "Native resolution detection of video sequences," in SMPTE 2015 Annual Technical Conference and Exhibition, SMPTE, 2015, hllps:/ieeexplore.ieee.org/abstracl/documenl/7399661. Manuscript, 26 pages.

Oogami et al., "A study on a compliant VBV Buffer Model for Distributed Video Transcoding", Information Processing Society of Japan Report-of-Research IPSJ SIG Technical Reports, vol. 2004, Mar. 4, 2004, pp. 31-36.

Mehrotra et al., "Rate-Distortion Optimized Client Side Rate Control for Adaptive Media Streaming", 2009 IEEE International Workshop on Multimedia Signal Processing, DOI: 10.1109/MMSP.2009.5293246, Oct. 5-7, 2009, 6 pages.

* cited by examiner

OPTIMIZING ENCODING OPERATIONS WHEN GENERATING A BUFFER-CONSTRAINED VERSION OF A MEDIA TITLE

CROSS-REFERENCE TO RELATED APPLICATIONS

This application is a continuation of the co-pending U.S. patent application titled, "OPTIMIZING ENCODING OPERATIONS WHEN GENERATING A BUFFER-CONSTRAINED VERSION OF A MEDIA TITLE," filed on Jan. 9, 2019 and having U.S. Ser. No. 16/244,033. The subject matter of this related application is hereby incorporated herein by reference.

BACKGROUND

Field of the Various Embodiments

Embodiments of the present invention relate generally to encoding technology and, more specifically, to optimizing encoding operations when generating a buffer-constrained version of a media title.

Description of the Related Art

A typical media streaming service provides access to a library of media titles that can be viewed on a range of different endpoint devices. Each endpoint device may connect to the media streaming service under different connection conditions that affect bandwidth and latency. In addition, each different endpoint device may include different hardware for outputting the media title to end user(s). For example, a given endpoint device could include a display screen having a particular screen size and a particular screen resolution.

In many implementations, an endpoint device that connects to a media streaming service executes an endpoint application that determines, for a given media title, an appropriate encoded version of the media title to stream to the endpoint device based on the connection conditions and the properties of the endpoint device. More specifically, the endpoint application attempts to select a particular encoded version of the media title that provides the best possible visual quality during playback of the media title on the endpoint device while avoiding playback interruptions due to buffering or re-buffering.

In some implementations, the endpoint application selects the particular encoded version of the media title based on a bitrate ladder. The bitrate ladder is designed to achieve a target visual quality during playback of a media title based on an available bandwidth. Each rung in the bitrate ladder specifies a different bitrate-resolution pair corresponding to a different pre-generated encoded version of the media title. To generate the encoded version of a media title corresponding to a given bitrate-resolution pair, the media content associated with the media title is sampled at the resolution to generate sampled media content. A rate control value is selected based on the bitrate and then an encoder is used to encode the sampled media content.

One drawback of the above "monolithic" encoding technique is that the complexity of the media content associated with a given media title oftentimes varies across the media title; whereas, the resolution and the rate control value used to encode the media content do not vary. As a result, encoding relatively simple portions of the media title may consume more computational and storage resources than what is necessary to meet the target visual quality. For example, a relatively simple portion of a media title could have the same visual quality regardless of whether that portion of media content is encoded using a bitrate of 560 kilobits per second (kbps) or using a bitrate of 3000 kbps. Among other things, such encoding inefficiencies waste computational and storage resources and increase the bandwidth required to stream encoded versions of media titles to endpoint devices.

In other implementations, to reduce these types of encoding inefficiencies, a media streaming service provider varies the resolution and the rate control value across the media title. Typically, a subsequence-based encoding application partitions the media title into different subsequences or sets of frames which are characterized by similar properties. The subsequence-based encoding application then encodes each subsequence numerous times at a variety of different resolutions and rate control values to generate encoded subsequences. Subsequently, the subsequence-based encoding application performs optimization operations to generate different optimized encoded versions of the media title. Each optimized encoded version of the media title includes a different combination of the encoded subsequences that span the length of the media title, and the resolution and/or rate control value may vary between the constituent encoded subsequences.

One drawback of the above "subsequence-based" encoding technique is that the optimized encoded versions of a media title do not necessarily comply with the transmission buffer constraints that are oftentimes associated with transmitting to and buffering at the endpoint devices. In general, if an encoded version of a media title complies with the relevant transmission buffer constraints, then the endpoint device is going to be more able to properly buffer and play back the media title, in particular on a constant bitrate transmission channel. If, however, the encoded version of a media title does not comply with the relevant transmission buffer constraints, then the endpoint device is going to be less able to properly buffer and play back the media title. In the latter case, playback interruptions that reduce the overall quality of the viewing experience can occur when streaming the media title to the endpoint device.

As an example, an encoded version of a media title that is transmitted through a constant bandwidth channel, such as those used in broadcast television, is typically required to comply with a constant bitrate (CBR) Video Buffer Verifier (VBV) constraint. In a constant bandwidth channel, encoded bits arrive at a decoder associated with an endpoint device at a fixed rate and are stored in a transmission buffer having a fixed size. As part of displaying a particular frame of the media title, the decoder removes the associated encoded bits from the transmission buffer. Because the number of bits used to encode each frame can vary across the media title, the number of encoded bits that the transmission buffer stores can also vary during playback of the media title. If an encoded version of a media title is compliant with the CBR VBV constraint, then the number of bits used to encode each frame is limited in an effort to ensure that the transmission buffer does not overflow or underflow during playback of the media title. However, if the transmission buffer overflows, then the transmission buffer may not have space to store the incoming encoded bits. Consequently, frame drop can occur. Further, if the transmission buffer underflows, then no encoded bits can be retrieved from the transmission buffer, and frame freeze can occur.

As the foregoing illustrates, what is needed in the art are more effective techniques for encoding media titles.

SUMMARY

One embodiment of the present invention sets forth a computer-implemented method for encoding a media title. The method includes generating a first convex hull of subsequence encode points based on a first set of encoding points and a first subsequence associated with a media title; generating a first global convex hull of media encode points based on a transmission buffer constraint, the first convex hull, and a second global convex hull of media encode points associated with a portion of the media title that occurs before the first subsequence in a playback order for the media title; selecting a first media encode point included in the first global convex hull based on a media metric; and determining a first encoded media sequence based on the first media encode point, wherein the first encoded media sequence is subsequently streamed to an endpoint device during playback of the media title.

At least one technical advantage of the disclosed techniques relative to the prior art is that encoded media sequences are generated based on sets of individually encoded subsequences and transmission buffer constraints. Notably, the individually encoded subsequences included in each encoded media sequence can be associated with different encoding points. Consequently, encoding inefficiencies typically associated with prior art monolithic encoding techniques are reduced. Further, by ensuring that the optimized encoded media sequences are complaint with the transmission buffer constraints, degraded viewing experiences attributable to transmission and buffering limitations when streaming the media title to endpoint devices are reduced. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
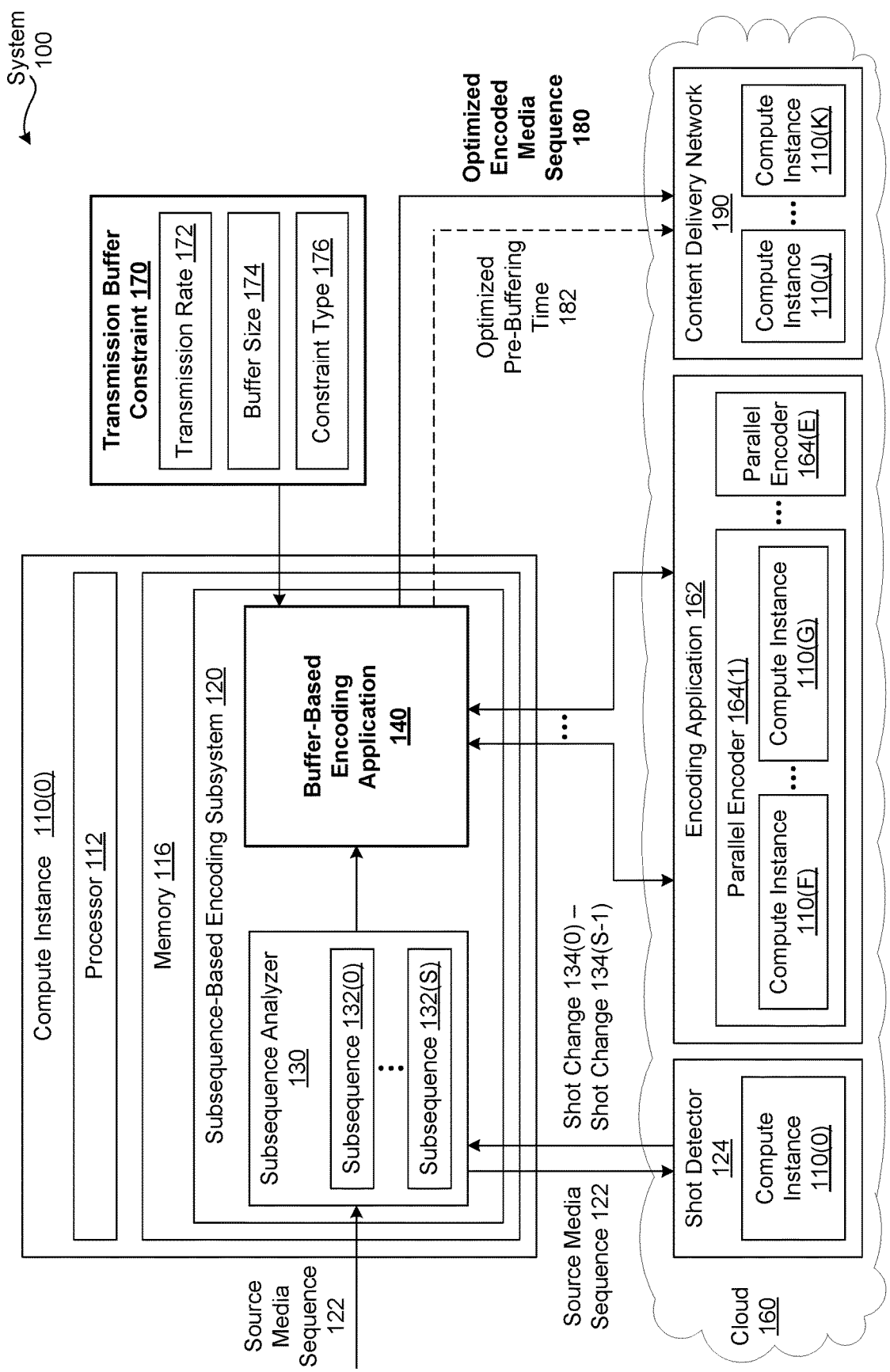
FIG. 1 is a conceptual illustration of a system configured to implement one or more aspects of the present invention.

In the following description, numerous specific details are set forth to provide a more thorough understanding of the various embodiments. However, it will be apparent to one of skilled in the art that the inventive concepts may be practiced without one or more of these specific details.

To optimize the overall visual experience that a media streaming service provides to viewers, the media streaming service provider oftentimes generates a bitrate ladder for each media title. The bitrate ladder for a given media title allows client-side endpoint devices to achieve a target visual quality during playback of the media title based on an available bandwidth. Each rung in the bitrate ladder specifies a different bitrate-resolution pair corresponding to a different pre-generated encoded version of the media title.

Some media streaming service providers use monolithic encoding techniques to generate the different encoded versions of the media title, where each encoded version of the media title is associated with a different bitrate. Namely, the resolution and a rate control value used to encode the media content associated with a given media title do not vary across the media title. However, because the complexity of the media content associated with a given media title typically varies across the media title, the resulting encoded versions of the media title are often associated with encoding inefficiencies. More specifically, encoding relatively simple portions of the media title may consume more computational and storage resources than are necessary to meet a target visual quality. Further, the bandwidth required to stream the encoded versions of the media title may be unnecessarily large.

For example, a movie could include relatively complex action portions and relatively simple monologues. The monologues could have the same visual quality regardless of whether the monologues are encoded using a bitrate of 3000 kilobits per second (kbps) or encoded using a bitrate of 560 kbps. By contrast, the required resources (e.g., computational resources, storage resources, bandwidth, etc.) associated with encoding the monologues using a bitrate of 3000 kbps exceed the required resources associated with encoding the monologues using a bitrate of 560 kbps. Accordingly, encoding the entire movie using a bitrate of 3000 kbps needlessly wastes computational and storage resources and unnecessarily increases the bandwidth required to stream the encoded version of the movie to endpoint devices.

To reduce the encoding inefficiencies typically associated with monolithic encoding techniques, some media streaming service providers use a conventional subsequence-based encoding application to generate different encoded versions of a given media title. The conventional subsequence-based application varies the resolution and rate control value across the media title based on a target metric value, such as a target visual quality or a target bitrate. In this fashion, each encoded version of the media title is associated with a different target metric value.

Typically, the conventional subsequence-based encoding application partitions the media title into different subsequences, where each subsequence is a shot that includes media content captured continuously from a given camera or other capture point. The conventional subsequence-based encoding application then encodes each subsequence numerous times at a variety of different encoding points to generate encoded subsequences. Each encoding point specifies a different combination of resolution and rate control value. Subsequently, the conventional subsequence-based encoding application performs optimization operations to generate different encoded versions of the media title.

Finally, the conventional subsequence-based encoding application selects one of the encoded versions of the media title as the optimized encoded version of the media title based on the target metric value. The optimized encoded version of the media title includes a different combination of the encoded subsequences that span the length of the media title, and the resolution and rate control value may vary between the constituent encoded subsequences. As a result, the conventional subsequence-based encoding application reduces the encoding inefficiencies typically associated with monolithic encoding techniques described above.

One drawback of this type of subsequence-based encoding technique is that the optimized encoded version of the media sequence does not necessarily comply with the transmission buffer constraints that are oftentimes associated with transmitting to and buffering at the endpoint devices. If an encoded version of a media sequence complies with the relevant transmission buffer constraints, then an associated endpoint device is going to be more able to properly buffer and play back the media title. If, however, the encoded version of the media sequence does not comply with the relevant transmission buffer constraints, then the endpoint device is going to be less able to properly buffer and play back media title in an uninterrupted fashion.

One example of a common transmission buffer constraint is a constant bitrate (CBR) Video Buffer Verifier (VBV) constraint. A CBR VBV constraint specifies a transmission rate associated with a constant bandwidth channel and a buffer size associated with an endpoint device. Encoded bits are streamed to an endpoint device via the constant bandwidth channel at the transmission rate. As encoded bits arrive at a decoder associated with the endpoint device, the encoded bits are stored in a transmission buffer having the buffer size. As part of displaying a particular frame of the media title, the decoder removes the associated encoded bits from the transmission buffer.

Because the number of bits used to encode each frame can vary across the media title, the number of encoded bits that the transmission buffer stores can also vary during playback of the media title. If the optimized encoded media sequence is compliant with the CBR VBV constraint, then the variation in the number of bits used to encode each frame is limited and the endpoint device is going to be more able to properly buffer and play back the media title.

If, however, the optimized encoded media sequence is not compliant with the CBR VBV constraint, then the variation in the number of bits used to encode each frame may cause the transmission buffer to underflow and/or overflow during playback of the media title. As a result, playback interruptions that adversely impact the associated viewing experience can occur. For example, at different points in time during the playback of the media title, the transmission buffer could be refilled faster than the transmission buffer was drained and, consequently, could overflow. If the transmission buffer were to overflow, then subsequent frames could be dropped, disrupting the playback of the media title.

With the disclosed techniques, however, a media streaming service provider can perform subsequence-based encoding of a given media title subject to a transmission buffer constraint. Each encoded subsequence included in the optimized encoded media sequence is individually encoded at a potentially different optimized encoding point subject to the transmission buffer constraint. Consequently, the disclosed techniques can reduce encoding inefficiencies associated with monolithic encoding techniques while reducing the likelihood of playback interruptions relative to prior-art subsequence-based encoding techniques.

In some embodiments, a buffer-based encoding application generates multiple encoded subsequences for each subsequence based on multiple encoding points. The buffer-based encoding application then incrementally generates encoded media sequences based on the encoded subsequences and the transmission buffer constraint in a playback order for the media title. More precisely, during an $n^{th}$ iteration, the buffer-based encoding application combines previously generated encoded media sequences spanning from the $0^{th}$ subsequence to the $(n-1)^{th}$ subsequence with encoded subsequences associated with the $n^{th}$ subsequence. The resulting encoded media sequences span from the $0^{th}$ subsequence to the $n^{th}$ subsequence.

As the buffer-based encoding application generates each encoded media sequence, the buffer-based encoding application tracks the buffer occupancy of the transmission buffer. If the buffer-based encoding application determines that a variation in buffer occupancy for a particular encoded media sequence exceeds the size of the transmission buffer, then the buffer-based encoding application discards the encoded media sequence. The buffer-based encoding application also discards any encoded media sequences that are associated with a sub-optimal trade-off between average bitrate and an overall visual quality. After generating encoded media sequences that each span the length of the media title, the buffer-based encoding application selects the encoded media sequence having the highest overall visual quality as the optimized encoded media sequence.

One advantage and technological advancement of the disclosed techniques relative to prior art techniques is that the optimized encoded media sequence is incrementally generated in a playback order based on sets of individually encoded subsequences and the transmission buffer constraint. Because each constituent encoded subsequence may be associated with a different encoding point, the overall visual quality level of the optimized encoded version of the media title is usually increased relative to a monolithically encoded version of the media title that is associated with the same average bitrate. Further, discarding encoded media sequences that do not comply with the transmission buffer constraint efficiently ensures that the optimized encoded media sequence complies with the transmission buffer constraint. As a result, the likelihood of degraded viewing experiences attributable to transmission buffer limitations when streaming the media title to endpoint devices is reduced relative to prior art subsequence-based encoding techniques.

System Overview

FIG. 1 is a conceptual illustration of a system 100 configured to implement one or more aspects of the present invention. As shown, the system 100 includes, without limitation, any number of compute instances 110 and a cloud 160. In general, the cloud 160 contains encapsulated shared resources, software, data, etc. For explanatory purposes, multiple instances of like objects are denoted with reference numbers identifying the object and parenthetical numbers identifying the instance where needed.

Any number of the compute instances 110 may reside outside the cloud 160 while other compute instances 110 may reside inside the cloud 160. In various embodiments, any number of the components of the system 100 may be distributed across multiple geographic locations. Further, any number of the components of the system 100 may be included in or distributed across one or more stand-alone devices, distributed computing environments, or clouds 160 in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. In alternative embodiments, each of the compute instances 110 may include any number of processors 112.

The memory 116 stores content, such as software applications and data, for use by the processor 112 of the compute instance 110. The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instances 110 are configured to implement one or more applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

Although not shown, a media streaming service provides access to a library of media titles that can be viewed on a range of different endpoint devices. The library of media titles includes without limitation, the media title associated with the source media sequence 122. Each endpoint device may connect to the media streaming service under different connection conditions that affect, without limitation, bandwidth and latency. In addition, each different endpoint device may include different hardware for outputting the media title to end user(s). For example, a given endpoint device could include a display screen having a particular screen size and a particular screen resolution.

As described previously herein, in many embodiments, an endpoint device that connects to a media streaming service executes an endpoint application that determines, for a given media title, an appropriate encoded version of the media title to stream to the endpoint device based on the connection conditions and the properties of the endpoint device. More specifically, the endpoint application attempts to select a particular encoded version of the media title that is associated with the best visual quality during playback of the media title on the endpoint device while avoiding playback interruptions due to buffering or re-buffering.

The compute instances 110 are configured to generate encoded versions of media titles for streaming. More precisely, the compute instances 110 are configured to generate the optimized encoded media sequence 180 based on the source media sequence 122. The source media sequence 122 includes, without limitation, any amount and type of media content that is associated with a media title. Examples of media content include, without limitation, any portion (including all) of feature length films, episodes of television programs, and music videos, to name a few. The optimized encoded media sequence 180 is a pre-generated encoded version of the media title and includes, without limitation, encoded media content derived from the media content included in the source media sequence 122.

As described in detail previously herein, the complexity and type of the media content associated with a given media title oftentimes varies across the media title. Using conventional monolithic encoding techniques, the resolution and the rate control value used to encode the media content do not vary across the media title. As referred to herein a "rate control value" is a value for a rate control parameter used to specify how an encoder is to allocate bits when performing encoding operations on media content in an associated rate control mode. One example of a rate control parameter is a quantization parameter (QP). As a result, encoding relatively simple portions of the media title may consume more computational and storage resources than what is necessary to meet the target visual quality. Among other things, such encoding inefficiencies waste computational and storage resources and increase the bandwidth required to stream encoded versions of media titles to endpoint devices.

To reduce these types of encoding inefficiencies, conventional subsequence-based encoding techniques generate encoded versions of media titles in which the resolution and the rate control value vary across the media title. However, one limitation of conventional subsequence-based encoding techniques is that the encoded versions of a media title do not necessarily comply with the transmission buffer constraints that are oftentimes associated with transmitting to and buffering at the endpoint devices. As a result, playback interruptions, such as freeze frame and freeze drop, that disrupt the viewing experience can occur when those encoded media titles are streamed to endpoint devices for playback.

More precisely, during streaming of an encoded version of the media title, as encoded bits arrive at a decoder associated with the endpoint device, the encoded bits are stored in a transmission buffer. As part of displaying a particular frame of the media title, the decoder removes the associated encoded bits from the transmission buffer. Because the number of bits used to encode each frame can vary across the media title, the number of encoded bits that the transmission buffer stores can also vary during playback of the media title. If the encoded version of the media title is compliant with the relevant associated transmission buffer constraints, then the variation in the number of bits used to encode each frame is limited and the endpoint device is going to be more able to properly buffer and play back the media title.

If, however, the encoded version of a media title is not compliant with the relevant transmission buffer constraints, then the variation in the number of encoded bits used to encode each frame may cause the transmission buffer to overflow or underflow. Overflows and underflows of the transmission buffer can cause playback interruptions, such as freeze frame and freeze drop, that disrupt the viewing experience when those encoded media titles are streamed to endpoint devices for playback.

Encoding Individual Subsequences

To comprehensively increase the quality of the viewing experience during streaming of a media title to an endpoint device relative to prior-art techniques, the system 100 includes, without limitation, a subsequence-based encoding subsystem 120. The subsequence-based encoding subsystem 120 resides in the memory 116 of the compute instance 110(0) and executes on the processor 112 of the compute instance 110(0).

The subsequence-based encoding subsystem 120 generates an optimized encoded media sequence 180 based on a transmission buffer constraint 170. The transmission buffer constraint 170 includes, without limitation, a transmission rate 172, a buffer size 174, and a constraint type 176. The transmission rate 172 specifies a rate at which encoded bits are transmitted to an endpoint device. The buffer size 174 specifies a minimum size of a transmission buffer associated with the endpoint device. The constraint type 176 specifies how encoded bits are transmitted and/or stored during streaming. In alternate embodiments, the system 100 may include any number and type of transmission buffer constraints 170 specified in any technically feasible fashion. In some such embodiments, the buffer-based encoding application 140 generates the encoded media sequence 180 based on all of the transmission buffer constraints 170.

One common constraint type 176 is a constant bit rate (CBR) Video Buffer Verifier (VBV) constraint. A CBR VBV constraint specifies a continuous transmission of encoded bits to a transmission buffer of a minimum buffer size 174 at the transmission rate 172. Consequently, if the transmission buffer becomes full, then the endpoint device is unable to store some of the transmitted encoded bits. As persons skilled in the art will recognize, a CBR VBV constraint is a usually a requirement for an encoded version of a media title to be streamed through a constant bandwidth channel, such as those used in broadcast television.

Another common constraint type 176 is a variable bit rate (VBR) VBV constraint. A VBR VBV constraint specifies a conditional transmission of encoded bits to a transmission buffer of a minimum buffer size 174 at the transmission rate 172. If the transmission buffer is not full, then the transmission of the encoded bits proceeds. If, however, the transmission buffer is full, then the transmission of the encoded bits pauses until the transmission buffer is no longer full. Some endpoint devices that include optical disk storage (e.g., Blu-Ray players) require that an encoded version of a media title is compliant with a VBR VBV constraint to ensure seamless playback of the media title.

Notably, some hardware-based endpoint devices used in adaptive streaming require that encoded versions of media titles comply with VBV constraints because of limitations in the level of pre-buffering capabilities of the transmission buffers. In adaptive streaming, the endpoint device may switch between different encoded versions of a media title during playback of a media title. To facilitate adaptive streaming, any number of the techniques described herein may be executed multiple times based on different transmission buffer constraints 170 to generate multiple optimized encoded media sequences 160. In alternative embodiments, the subsequence-based encoded subsystem 120 may be modified to generate a set of optimized encoded media sequences 180 based on a set of transmission buffer constraints 170. In such embodiments, each optimized encoded media sequence 180(x) is compliant with a different transmission buffer constraint 170(x).

As shown, the subsequence-based encoding subsystem 120 includes, without limitation, a subsequence analyzer 130 and a buffer-based encoding application 140. The subsequence analyzer 130 partitions the source media sequence 122 into any number of subsequences 132(0)-132(S). The subsequences 132 are non-overlapping, contiguous sets of frames that, together, span the source media sequence 122. Each set of frames may represent a variety of different constructs, including a group of pictures (GOP), a sequence of frames, a plurality of sequences of frames, and so forth. For instance, in some embodiments, each subsequence 132 is a different shot included in the source media sequence 122. As referred to herein, a "shot" is a sequence of frames that usually have similar spatial-temporal properties and run for an uninterrupted period of time.

Upon receiving the source media sequence 122, the subsequence analyzer 130 performs any number of analysis operations on the source media sequence 122 to determine the subsequences 132 based on any number and type of criteria. For instance, in various embodiments, the subsequence analyzer 130 may be configured to identify sets of frames for which a consistency metric lies within a specified range. In other embodiments, and as depicted in FIG. 1, the subsequence analyzer 130 determines the subsequences 132 based on any number of shot changes 134.

More specifically, the subsequence analyzer 130 transmits the source media sequence 122 to a shot detector 124 that resides in the cloud 160. The shot detector 124 executes any number of shot detection algorithms based on the source media sequence 122 to identify the shot changes 134. Some examples of shot detection algorithms include, without limitation, a multi-scale sum-of-absolute-differences algorithm, a motion-compensated residual energy algorithm, a histogram of differences algorithm, a difference of histograms algorithm, and so forth. Each of the shot changes 134 specifies a boundary between a different pair of shots. The shot detector 124 then transmits the shot changes 134 to the subsequence analyzer 130. Subsequently, the subsequence analyzer 130 performs partitioning operations on the source media sequence 122 based on the shot changes 134 to determine the subsequences 132.

In some embodiments, the subsequence analyzer 130 and/or the subsequence-based encoding subsystem 120 may perform any number type of additional operations as part of generating the subsequences 134. For instance, in various embodiments, the subsequence analyzer 130 removes extraneous pixels from the source media sequence 122. For example, the subsequence analyzer 130 could remove pixels included in black bars along border sections of the source media sequence 122.

In various embodiments, the subsequence-based encoding subsystem 120 ensures that the initial frame of each subsequence 132 is encoded as a key frame during encoding operations. As a general matter, a "key frame" and all subsequent frames from the same subsequence 132 that are included in an encoded media sequence are decoded independently of any proceeding frames included in the encoded media sequence.

The subsequence-based encoding subsystem 120 may ensure that the different initial frames of the different subsequences 132 are encoded as key frames in any technically feasible fashion. For instance, in some embodiments, the buffer-based encoding application 140 configures an encoding application 162 to encode frames as key frames based on a key frame location list (not shown) when encoding media content. In other embodiments, the buffer-based encoding application 140 and/or the encoding application 162 may perform any number of encoding operations to encode the different initial frames of the different subsequences 132 as key frames when encoding media content.

As persons skilled in the art will recognize, during playback, the media title associated with the source media sequence 122 is switchable between decoded versions of different optimized encoded media sequences 180 at aligned key frames to optimize a viewing experience based on any number of relevant criteria. Examples of relevant criteria include the current connection bandwidth, the current connection latency, the content of the upcoming subsequence 132, and the like.

As shown, the buffer-based encoding application 140 generates the optimized encoded media sequence 180 based on the subsequences 132 and the transmission buffer constraint 170. The optimized encoded media sequence 180 includes, without limitation, S+1 encoded subsequences (not shown in FIG. 1) that are associated, respectively, with the subsequences 132(0)-132(S). Each of the encoded subsequences includes encoded media content derived from the media content included in the associated subsequence 132.

Figure 2:
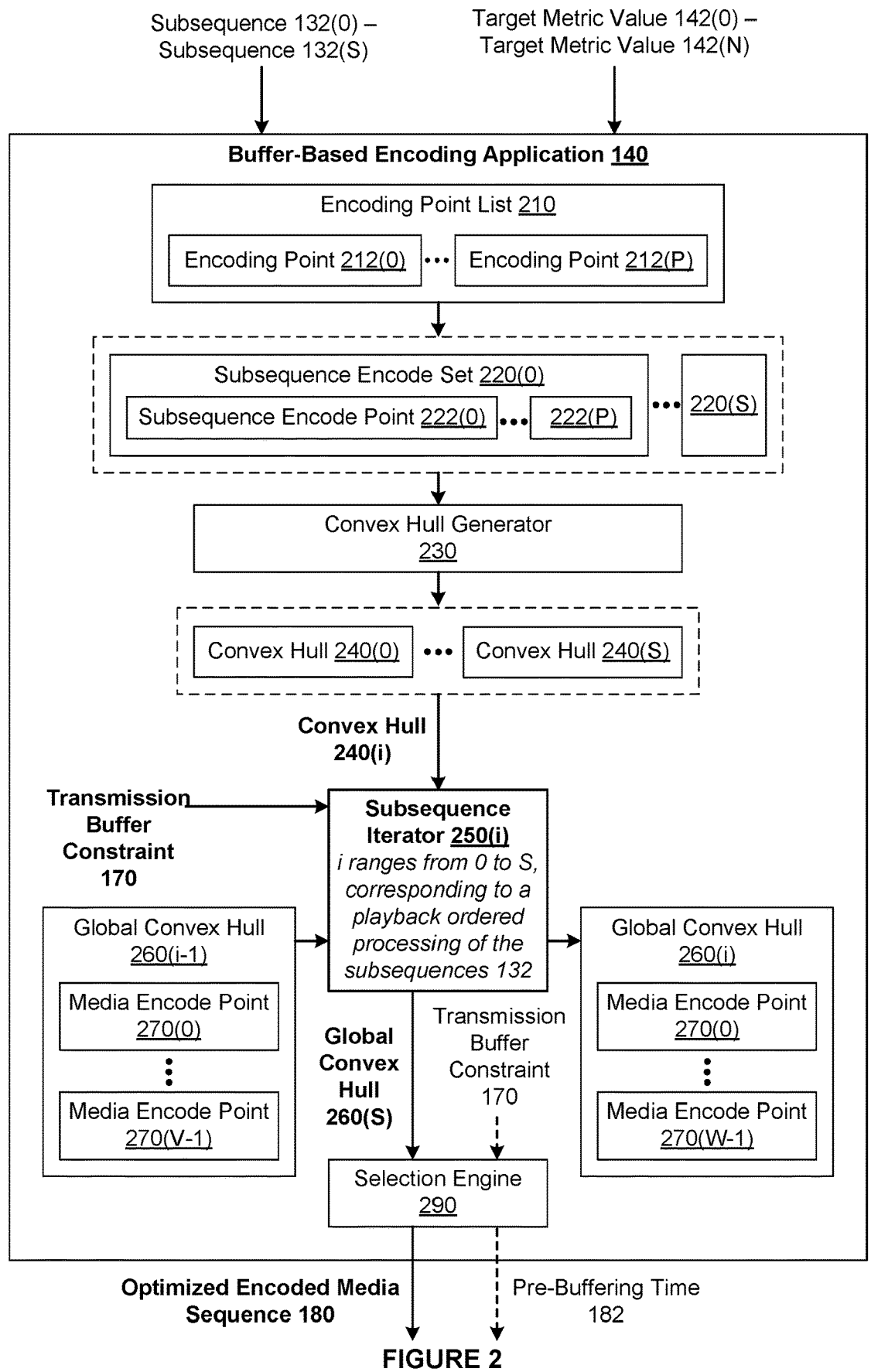
FIG. 2 is a more detailed illustration of the buffer-based encoding application of FIG. 1, according to various embodiments of the present invention.

As described in greater detail in conjunction with FIG. 2, for each of the subsequences 132, the buffer-based encoding application 140 generates multiple encoded subsequences based on an encoding point list. The encoding point list may include any number of encoding points. Each encoding point includes, without limitation, a resolution and a rate control value. The buffer-based encoding application 140 may generate the encoded subsequences in any technically feasible fashion. Further, as a general matter, the buffer-based encoding application 140 may generate encoded video content derived from video content based on a given resolution and given rate control value in any technically feasible fashion.

For instance, in some embodiments, to generate the encoded subsequence corresponding to a given subsequence 132 and a given encoding point, the buffer-based encoding application 140 performs sampling operations on the subsequence based on the resolution to generate a sampled subsequence. The buffer-based encoding application 140 then configures the encoding application 162 to encode the sampled subsequence at the rate control value to generate the encoded subsequence.

As shown, the encoding application 162 resides in the cloud 160 and is configured to efficiently perform encoding operations via one or more parallel encoders 164. Each of the parallel encoders 164 may include any number of compute instances 110. In alternative embodiments, the buffer-based encoding application 140 may perform encoding operations and the system 100 may omit the encoding application 162. In the same or other embodiments, the system 100 may include a sampling application, and the buffer-based encoding application 140 may configure the sampling application to perform sampling operations.

In various embodiments, the buffer-based encoding application 140 may perform sampling operations and encoding operations at any level of granularity (e.g., per frame, per subsequence 132, per source media sequence 122, etc.) in any combination and in any technically feasible fashion. For instance, in some embodiments, the buffer-based encoding application 140 may perform sampling operations on the source media sequence 122 based on a given resolution to generate a sampled media sequence. Subsequently, for each encoding point associated with the resolution, the buffer-based encoding application 140 may configure the encoding application 162 to encode the sampled media content corresponding to the associated subsequence 132 at the associated rate control value.

For each encoded subsequence, the buffer-based encoding application 140 computes a bitrate, a quality score, and a distortion level. The buffer-based encoding application 140 may compute the bitrate, the quality score, and the distortion level for a given encoded subsequence in any technically feasible fashion. For each encoded subsequence, the buffer-based encoding application 140 then generates a subsequence encode point (not shown in FIG. 1). As described in greater detail in conjunction with FIG. 4, each subsequence encode point includes, without limitation, the encoded subsequence, the associated encoding point, the bitrate of the encoded subsequence, the quality score of the encoded subsequence, and the distortion level of the encoded subsequence.

For each of the subsequences 132($x$), the buffer-based encoding application 140 generates a different convex hull based on the subsequence encode points associated with the subsequence 132($x$). In this fashion, the convex hull associated with a given subsequence 132($x$) includes any number of the subsequence encode points associated with the subsequence 132($x$). In general, for a given subsequence 132, the subsequence encode points included in the associated convex hull minimize the bitrate for different distortion levels.

Figure 7:
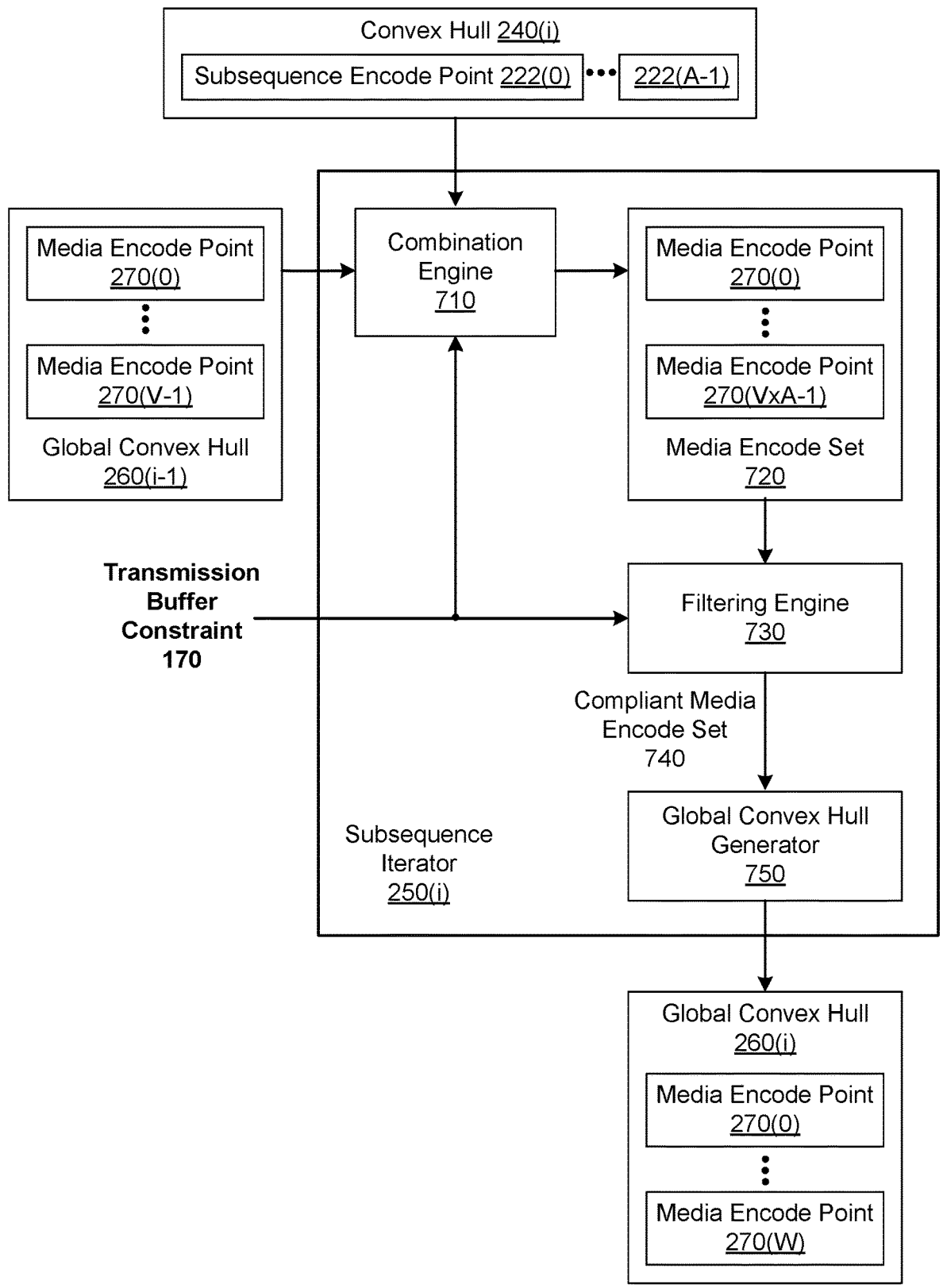
FIG. 7 is a more detailed illustration of the subsequence iterator of FIG. 2, according to various embodiments of the present invention.

As described in greater detail in conjunction with FIGS. 2 and 7, the buffer-based encoding application 140 iteratively processes each of the convex hulls in a temporal playback order to generate a different associated global convex hull of media encode points. For explanatory purposes only, the "playback order" corresponds to the order in which an endpoint device plays back the subsequences 132—from subsequence 132(0) to subsequence 132(S).

Each media encode point in the $i^{th}$ global convex hull is associated with a portion of the media title that spans from the $0^{th}$ subsequence to the $i^{th}$ subsequence. In particular, each media encode point is associated with a different encoded media sequence. Each encoded media sequence includes, without limitation, (i+1) encoded subsequences, where each encoded subsequence is included in a different one of the convex hulls associated with the subsequences 132(0)-132(i). Importantly, each of the media encode points included in the $i^{th}$ global convex hull minimizes the average bitrate for a different overall distortion level subject to the transmission buffer constraint 170.

The buffer-based encoding application 140 determines the optimized encoded media sequence 180 based on the global convex hull associated with the subsequence 132(S) that occurs last in the playback order. The global convex hull associated with the subsequence 132(S) is also referred to herein as the "final" convex hull. The buffer-based encoding application 140 compares the average bitrates of the encoded media sequences associated with the final global convex hull and sets the optimized encoded media sequence 180 equal to the encoded media sequence having the highest average bitrate.

As persons skilled in the art will recognize, the optimized encoded media sequence 180 has a higher overall quality level than any other encoded media sequence associated with the final global convex hull. Consequently, the optimized media sequence 180 is an encoded version of the media title that both complies with the transmission buffer constraint 170 and optimizes the overall visual quality during playback of the media title on an endpoint device. In alternative embodiments, the buffer-based encoding application 140 may select the optimized encoded media sequence 180 based on the final global convex hull and any number and type of criteria associated with any number and type of media metrics in any technically feasible fashion.

As referred to herein, a media metric may be any measurement that corresponds to one or more properties of encoded video content, video content, audio content, and/or encoded audio content. Some examples of media metrics include, without limitation, bitrate, distortion metrics, audio quality metrics, visual quality metrics, etc. Example of visual quality metrics include, without limitation, a peak signal-to-noise ratio (PSNR), a linear video multimethod assessment fusion ((VMAF) metric, and a harmonic VMAF (VMAFh), to name a few.

As described in greater detail in conjunction with FIG. 2, the buffer-based encoding application 140 optionally computes an optimized pre-buffering time 182 based on the optimized encoded media sequence 180 and the transmission buffer constraint 170. In general, during streaming, a pre-buffering time specifies a total amount of time that an endpoint device waits after the streaming of a media title begins before beginning to play back a media title. During the pre-buffering time, the transmission buffer stores encoded bits and, consequently, when the endpoint device begins to play back the media title, the transmission buffer has an initial occupancy that is determined by the pre-buffering time.

Finally, the buffer-based encoding application 140 transmits the optimized encoded media sequence 180 and, optionally, the optimized pre-buffering time 182 to the CDN 190 for distribution to endpoint devices. In alternative embodiments, the buffer-based encoding application 140 may cause the optimized pre-buffering time 182, the optimized encoded media sequence 180, and/or any number of the encoded subsequences to be delivered to endpoint devices in any technically feasible fashion. In the same or other embodiments, any amount and type of the functionality associated with the subsequence-based encoding application may be implemented in or distributed across any number of compute instances 110 and/or any number of endpoint devices, in any technically feasible fashion.

For explanatory purposes only, the techniques described herein are described in the context of video encoding. However, as persons skilled in the art will recognize, the techniques described herein may be modified to optimize audio encoding instead of or in addition to video encoding. For instance, in some embodiments, an audio track may be partitioned into "audio scenes." The audio scenes may be sampled via audio rendering hardware. The sampled audio scenes may be encoded via an audio encoder that is configured via a quantization parameter and/or bitrate setting. The quality scores of the encoded audio scenes may be computed via a perceptual audio quality metric, such as the Perceptual Evaluation of Audio Quality (PEAQ) algorithm. Notably, the audio encoder, any number of associated configuration parameters, the resolution and/or a rate control value may be optimized for each audio scene based on any of the techniques described herein in any combination.

Further, although the techniques described herein are described in the context of media streaming, the techniques described herein may be modified to optimize encoding for any type of media consumption. For example, the techniques may be altered to optimize encoding for online video gaming, screen-content sharing, two-way video conferencing, electronic communication, etc.

Note that the techniques described herein are illustrative rather than restrictive, and may be altered without departing from the broader spirit and scope of the invention. Many modifications and variations on the functionality provided by the subsequence-based encoding subsystem 120, the subsequence analyzer 130, the buffer-based encoding application 140, the shot detector 124, the encoding application 162, and the content delivery network 190 will be apparent to those of ordinary skill in the art without departing from the scope and spirit of the described embodiments. As a general matter, the techniques outlined herein are applicable to generating an encoded media sequence based on individually encoded subsequences and any number and type of transmission buffer constraints in any technically feasible fashion.

It will be appreciated that the system 100 shown herein is illustrative and that variations and modifications are possible. For example the functionality provided by the subsequence-based encoding subsystem 120, the subsequence analyzer 130, the buffer-based encoding application 140, the shot detector 124, the encoding application 162, and the content delivery network 190 as described herein may be integrated into or distributed across any number of software applications (including one), hardware devices (e.g., a hardware-based encoder), and any number of components of the system 100. Further, the connection topology between the various units in FIG. 1 may be modified as desired.

FIG. 2 is a more detailed illustration of the buffer-based encoding application 140 of FIG. 1, according to various embodiments of the present invention. As shown, the buffer-based encoding application 140 includes, without limitation, an encoding point list 210, subsequence encode sets 220, a convex hull generator 230, convex hulls 240, a subsequence iterator 250, global convex hulls 260, and a selection engine 290. The number of the subsequence encode sets 220 equals the number of subsequences 132. Similarly, the number of the convex hulls 240 equals the number of subsequences 132. In general, the subsequence 132($x$) is associated with the subsequence encode set 220($x$) and the convex hull 240($x$).

As shown, the encoding point list 210 includes any number of encoding points 212(0)-212(P). As described in greater detail in conjunction with FIG. 3, each of the encoding points 212 includes, without limitation, a resolution and a rate control value. In alternative embodiments, each of the encoding points 212 may specify any number and type of parameters that impact encoding operations in any technically feasible fashion. For instance, in some embodiments, each of the encoding points 212 may specify a value for a "speed" configuration parameter associated with the encoding application 162.

In operation, the buffer-based encoding application 140 generates the subsequence encode sets 220(0)-220(S) based on the subsequences 132(0)-132(S) and the encoding point list 210. Each of the subsequence encode sets 220(0)-220(S) includes, without limitation, subsequence encode points 222(0)-222(P). The number of subsequence encode points 222 included in each of the subsequence encode sets 220 equals the number of the encoding points 212 included in the encoding point list 210. As described in greater detail in conjunction with FIG. 4, each of the subsequence encode points 222(x) includes, without limitation, the associated encoding point 212(x), an encoded subsequence, a bitrate, a quality score, and a distortion level.

For each combination of subsequence 132(x) and encoding point 212(y), the buffer-based encoding application 140 generates a corresponding subsequence encode point 222(y) and adds the subsequence encode point 222(y) to the subsequence encode set 220(x). More specifically, the buffer-based encoding application 140 configures the encoding application 162 to encode the subsequence 132(x) at the resolution and rate control value included in the encoding point 212(y). The buffer-based encoding application 140 then computes a bitrate of the encoded subsequence, a quality score of the encoded subsequence, and a distortion level of the encoded subsequence. As a result, the buffer-based encoding application 140 generates (S+1)×(P+1) different subsequence encode points 222.

In alternative embodiments, each of the subsequences 132(x) may be associated with a different encoding point list 210(x) and the number of encoding points 212 in the encoding point list 210(x) may differ from the number of encoding points 212 in any of the other encoding point lists 210. In a complementary fashion, the number of subsequence encode points 222 included in the subsequence encode set 220(x) may differ from the number of subsequence encode points 222 included in any of the other subsequence encode sets 220.

The buffer-based encoding application 140 may generate each encoded subsequence and determine the associated bitrate, the associated quality score, and the associated distortion level in any technically feasible fashion. For instance, in some embodiments, to generate the encoded subsequence associated with both the subsequence 132(x) and the encoding point 212(y), the buffer-based encoding application 140 first performs sampling operations to generate a sampled subsequence. More specifically, the buffer-based encoding application 140 samples the subsequence 132(x) based on the resolution included in the encoding point 212(y) to generate a sampled subsequence. Subsequently, the buffer-based encoding application 140 causes the encoding application 162 to encode the sampled subsequence using the rate control value included in the encoding point 212(y) to generate the encoded subsequence.

In some embodiments, to determine the quality score of the encoded subsequence, the buffer-based encoding application 140 decodes the encoded subsequence to generate a decoded subsequence. The buffer-based encoding application 140 then re-samples (i.e., up-samples or down-samples) the decoded subsequence to a target resolution to generate a re-constructed subsequence that is relevant to the display characteristics of a class of endpoint devices.

In alternative embodiments, the buffer-based encoding application 140 may compute any number of quality scores for any number of resolutions. For example, a certain video may be delivered in 3840×2160 resolution, yet be intended to be consumed by a large number of displays in 1920×1080 resolution. Another class of endpoint devices, for example laptop computers, is expected to display the same video in 1280×720 resolution. Yet another class of endpoint devices, for example, tablet or smartphone devices, is expected to display the same video in 960×540 resolution. The buffer-based encoding application 140 could up-sample the decoded subsequence to all these target resolutions in order to assess quality, when considering one of these different classes of endpoint devices, correspondingly.

The buffer-based encoding application 140 then analyzes the reconstructed subsequence to generate the quality score for a quality metric (QM). For instance, in some embodiments the buffer-based encoding application 140 implements a VMAF (or harmonic VMAF) algorithm to generate a VMAF score for each encoded subsequence based on the associated re-constructed subsequence. Although a multitude of video quality metrics, such as VMAF scores, can be calculated at different target resolutions, it should be clear that, when comparing qualities among encoded subsequences associated with different resolutions, applications need to use the same target resolution for re-sampling, after decoding. For instance, in some embodiments, the buffer-based encoding application 140 re-samples the decoded subsequence to 1920×1080 to generate a re-constructed subsequence. Subsequently, the buffer-based encoding application 140 computes the quality score for the encoded subsequence based on the associated re-constructed subsequence.

The buffer-based encoding application 140 may generate the bitrate in any technically feasible fashion. For instance, in some embodiments, the buffer-based encoding application 140 may divide the total number of encoded bits included in the encoded subsequence by the length of the associated subsequence 132. In the same or other embodiments, the buffer-based encoding application 140 may compute the distortion level based on the quality score and any technically feasible technique for converting quality scores to distortion levels. For example, the buffer-based encoding application 140 could invert the quality score to determine the distortion level. In another example, the buffer-based encoding application 140 could subtract the quality score from a constant value to determine the distortion level.

For each of the subsequences 132(x), the convex hull generator 230 generates a convex hull 240(x) based on the subsequence encode set 220(x). Each of the convex hulls 240(x) includes, without limitation, the subsequence encode points 222 included in the subsequence encode set 220(x) that minimize bitrate for a given distortion level. A detailed example of how the convex hull generator 230 generates the convex hull 240(0) based on the subsequence encode set 220(0) is described in conjunction with FIG. 5.

The subsequence iterator 250 processes the convex hulls 240 sequentially, in a playback order for the media title. More specifically, for an index i that starts at 0 and ends at S, an instance of the subsequence iterator 250(i) processes the convex hull 240(i) associated with the subsequence 132(i). As described in greater detail in conjunction with FIG. 7, the subsequence iterator 250(i) generates the global convex hull 260(i) based on the global convex hull 260(i−1) and the convex hull 240(i). The global convex hull 260(i) is associated with the subsequences 132(0)-132(i) and includes, without limitation, any number of media encode points 270. The number of media encode points 270 included in the global convex hull 260(i) may differ from the number of media encode points 270 in any of the other global convex hulls 260.

Figure 6:
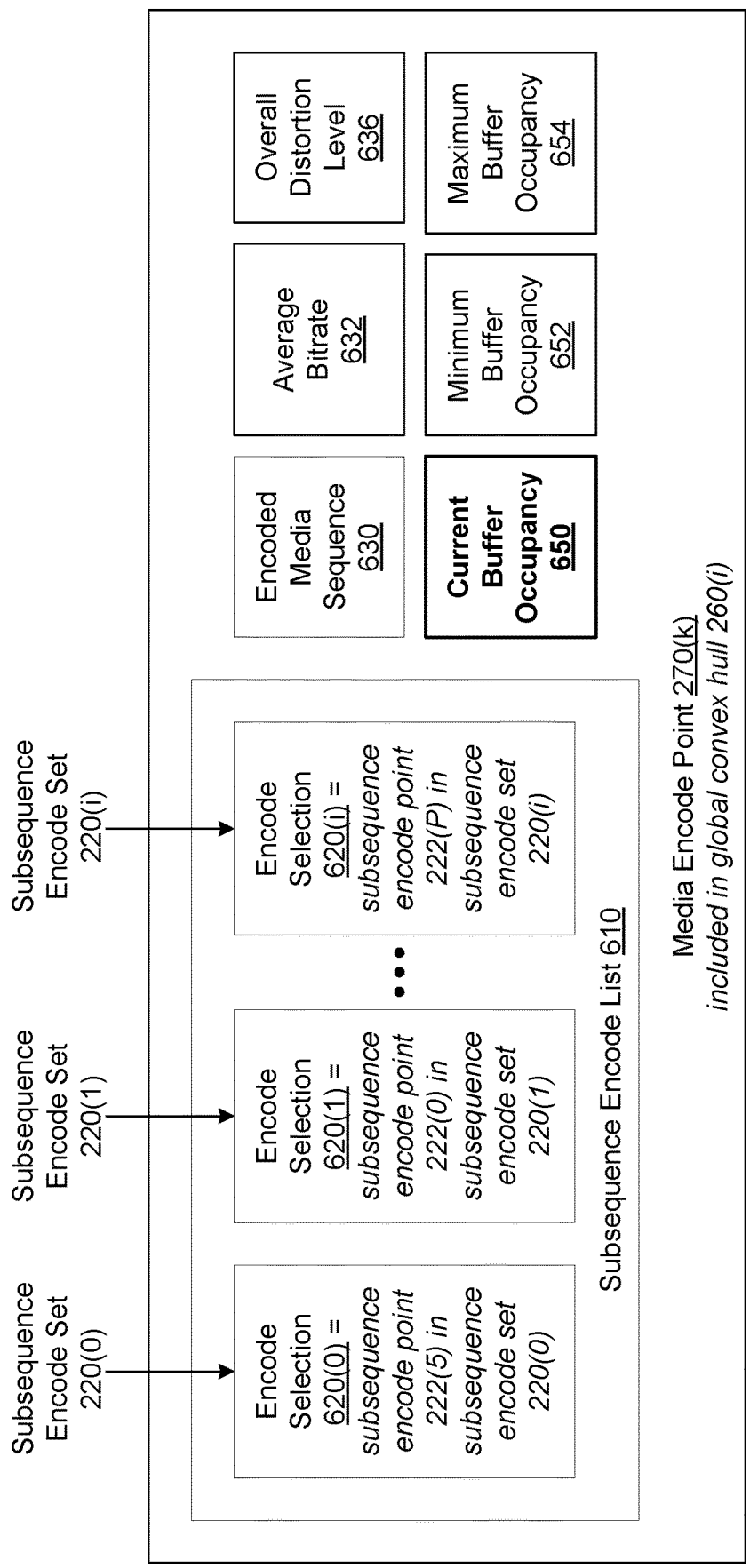
FIG. 6 is a more detailed illustration of one of the media encode points of FIG. 2, according to various embodiments of the present invention.

As described in greater detail in conjunction with FIG. 6, each of the media encode points 270 includes, without limitation, a subsequence encode list, an encoded media sequence, an average bitrate, an overall distortion level, a current buffer occupancy, a minimum buffer occupancy, and a maximum buffer occupancy. For each of the media encode points 270 included in the global convex hull 260(i), the subsequence encode list specifies (i+1) subsequence encode points. More precisely, the subsequence encode list specifies a different subsequence encode point for each of the subsequences 132(0)-132($i$). The encoded media sequence includes, without limitation, the (i+1) encoded subsequences included in the (i+1) subsequence encode points specified in the subsequence encode list. The average bitrate and the overall distortion level specify, respectively, a bitrate of the encoded media sequence and a distortion level of the encoded media sequence.

The current buffer occupancy, the minimum buffer occupancy, and the maximum buffer occupancy specify characteristics of an exemplary transmission buffer when streaming the encoded media sequence to an exemplary endpoint device as per the transmission buffer constraint 170. The current buffer occupancy specifies the number of bits that are stored in the exemplary transmission buffer when the encoded media sequence is decoded for playback on the exemplary endpoint device. The minimum buffer occupancy and the maximum buffer occupancy specify, respectively, the minimum and maximum number of bits that are stored in the exemplary transmission buffer during streaming of the encoded media sequence to the exemplary endpoint device.

Although not shown, to generate the global convex hull 260(0), the buffer-based encoding application 140 initializes the subsequence iterator 250(0). More precisely, the buffer-based encoding application 140 generates an initial global convex hull 260(−1) that includes a single initialization media encode point 270. The buffer-based encoding application 140 sets the subsequence encode list included in the initialization media encode point 270 equal to an empty set and the encoded subsequence included in the initialization media encode point 270 equal to NULL. The buffer-based encoding application 140 sets each of the current buffer occupancy, the minimum buffer occupancy, and the maximum buffer occupancy included in the initialization media encode point 270 equal to the buffer size 174. In alternative embodiments, the buffer-based encoding application 140 may initialize the subsequence iterator 250(0) in any technically feasible fashion. For instance, in some embodiments, the buffer-based encoding application 140 may initialize the subsequence iterator 250(0) based on a specified pre-buffering time.

In operation, to generate the global convex hull 260($i$), the subsequence iterator 250($i$) combines each of the subsequence encode lists associated with the global convex hull 260($i-1$) with each of the subsequence encode points included in the convex hull 240($i$) to generate new subsequence encode lists. Accordingly, if the global convex hull 260($i-1$) includes N media encode points 270 and the convex hull 240($i$) includes M subsequence encode points, then the subsequence iterator 250($i$) generates (N×M) new subsequence encode lists.

For each new subsequence encode list, the subsequence iterator 250($i$) generates a new media encode point 270. More precisely, for a given new subsequence encode list, the subsequence iterator 250($i$) aggregates the different encoded subsequences included in the subsequence encode points specified in the subsequence encode list to generate an encoded media sequence. The subsequence iterator 250($i$) computes the average bitrate and the overall distortion level based on the encoded media sequence. The subsequence iterator 250($i$) then computes the current buffer occupancy, the minimum buffer occupancy, and the maximum buffer occupancy based on encoded media sequence and the transmission buffer constraint 170. Subsequently, the subsequence iterator 250($i$) generates a new media encode point 270 that includes the new subsequence encode list, the associated encoded media sequence, the average bitrate, the overall distortion level, the current buffer occupancy, the minimum buffer occupancy, and the maximum buffer occupancy. The subsequence iterator 250($i$) adds the new media encode point 270 to a media encode set (not shown in FIG. 2).

Subsequently, the subsequence iterator 250($i$) performs filtering operations on the media encode set based on the transmission buffer constraint 170 to generate a compliant media encode set (not shown in FIG. 1). As part of the filtering operations, the subsequence iterator 250($i$) discards any media encode points 270 included in the media encode set that do not comply with the transmission buffer constraint 170. The subsequence iterator 250($i$) then discards any media encode points 270 included in the compliant media encode set that are associated with a sub-optimal trade-off between average bitrate and an overall visual quality to generate the global convex hull 260($i$).

Importantly, for the portion of the media title that includes the subsequences 132(0)-132($i$), each of the media encode points 270 included in the global convex hull 260($i$) minimizes the average bitrate for a different overall distortion level subject to the transmission buffer constraint 170. Further, because the global convex hull 260($i$) typically includes significantly fewer media encode points than the associated media encode set, the number of subsequence encode points included in each of the subsequent subsequence media encode sets is reduced. Consequently, the time required to generate the subsequent global convex hulls 260 is optimized.

For example, suppose that the media encode set were to include 100 media encode points 270 and the subsequence iterator 250($i$) were to discard 60 of the media encode points 270 based on the transmission buffer constraint 170. Further, suppose that the subsequence iterator 250($i$) were to determine that 30 of the 40 remaining media encode points 270 were associated with sub-optimal trade-offs between an average bitrate and an overall visual quality. The resulting global convex hull 260($i$) would include 10 media encode points 270. Subsequently, the subsequence iterator 250($i$+1) would combine the 10 media encode points 270 included in the global convex hull 260($i$) with A points included in the convex hull 240($i$+1) to generate a new media encode set that would include (10×A) media encode points 270.

As shown, the selection engine 290 determines the optimized encoded media sequence 180 based on the global convex hull 260(S). As described previously herein, the global convex hull 260(S) is associated with all the subsequences 132(0)-132(S). To determine the optimized media sequence 180, the selection engine 290 compares the average bitrates of the media encode points 270 included in the global convex hull 260(S) to determine an optimized media encode point 270 having the highest average bitrate. The selection engine 290 then sets the optimized encoded media sequence 180 equal to the encoded media sequence included in the optimized media encode point 270.

As persons skilled in the art will recognize, the optimized encoded media sequence 180 has a higher overall quality level than any other encoded media sequence associated with the global convex hull 260(S). Consequently, the optimized media sequence 180 is an encoded version of the media title that both complies with the transmission buffer constraint 170 and optimizes the overall visual quality during playback of the media title on an endpoint device. In alternative embodiments, the selection engine 290 may select the optimized encoded media sequence 180 based on the global convex hull 260(S) and any number and type of criteria associated with any number and type of media metrics in any technically feasible fashion.

In some embodiments, the subsequence iterator 250 does not generate the encoded media sequences included in the media encode points 270. For each media encode point 270, the subsequence iterator 250 determines properties of the associated encoded media subsequence based on the associated subsequence encode list. In particular, the subsequence iterator 250 computes the average bitrate, the overall distortion level, the current buffer occupancy, the minimum buffer occupancy, and the maximum buffer occupancy based on the subsequence encode list. After selecting the optimized media encode point 270, the selection engine 290 generates the optimized encoded media sequence 180 based on the subsequence encode list included in the optimized media encode point 270. More precisely, the selection engine 290 aggregates the different encoded subsequences specified in the subsequence encode list included in the optimized media encode point 270 to generate the optimized encoded media sequence 180. In this fashion, each subsequence encode list is an "encoding recipe" that specifies how the associated encoded media subsequence is generated.

After the selection engine 290 determines the optimized encoded media sequence 180, the selection engine 290 determines whether the transmission buffer constraint 170 is associated with a configurable pre-buffering time. In general, a pre-buffering time specifies a total number of encoded bits that an endpoint device is to store before beginning to play back a media title. The selection engine 290 may determine whether the transmission buffer constraint 170 is associated with a configurable pre-buffering time in any technically feasible fashion.

For instance, in some embodiments, if the constraint type 176 is CRB VBV, then the selection engine 290 determines that the transmission buffer constraint 170 is associated with a configurable pre-buffering time. Otherwise, the selection engine 290 determines that the transmission buffer constraint 170 is not associated with a configurable pre-buffering time. In other embodiments, the selection engine 290 determines whether the transmission buffer constraint 170 is associated with a configurable pre-buffering time based on user input received via a graphical user interface (not shown).

If the selection engine 290 determines that the transmission buffer constraint 170 is associated with a configurable pre-buffering time, then the selection engine 290 computes an optimized pre-buffering time 182 based on the optimized media encode point 270. More precisely, the selection engine 290 sets an initial buffer occupancy equal to the difference between the buffer size 174 and the minimum buffer occupancy included in the optimized media encode point 270. The selection engine 290 then sets the sets the optimized pre-buffering time 182 equal to the quotient of the initial buffer occupancy and the transmission rate 172. In alternative embodiments, the buffer-based encoding application 140 may compute the optimized pre-buffering time 182 and/or an initial buffer occupancy in any technically feasible fashion. The selection engine 290 then transmits the optimized pre-buffering time 182 to a content delivery network (CDN) 190 for distribution to endpoint devices in conjunction with the optimized encoded media sequence 180.

Irrespective of whether the transmission buffer constraint 170 is associated with a configurable pre-buffering time, the selection engine 290 transmits the optimized encoded media sequence 180 to the CDN 190 for distribution to endpoint devices. In various embodiments, the selection engine 290 may be configured to identify each of the individual encoded subsequences that are included in the optimized encoded media sequences 180. The selection engine 290 may then transmit the identified encoded subsequences to the CDN 190 for distribution to endpoint devices.

In alternative embodiments, the selection engine 290 may compute and transmit any number and type of encoded subsequences, configuration parameters, and the like to the CDN 190 or any number of endpoint devices in any technically feasible fashion. For instance, in some embodiments, the selection engine 190 may transmit an initial buffer occupancy to the CDN 190 instead of the optimized pre-buffering time 182. In other embodiments, the selection engine 290 may transmit the optimized encoded media sequence 180 and, optionally, the optimized pre-buffering time 182 to any number of endpoint devices in any technically feasible fashion. For example, the selection engine 290 could signal the pre-buffering time through a system header as part of streaming the optimized encoded media sequence 180 to endpoint devices.

Figure 3:
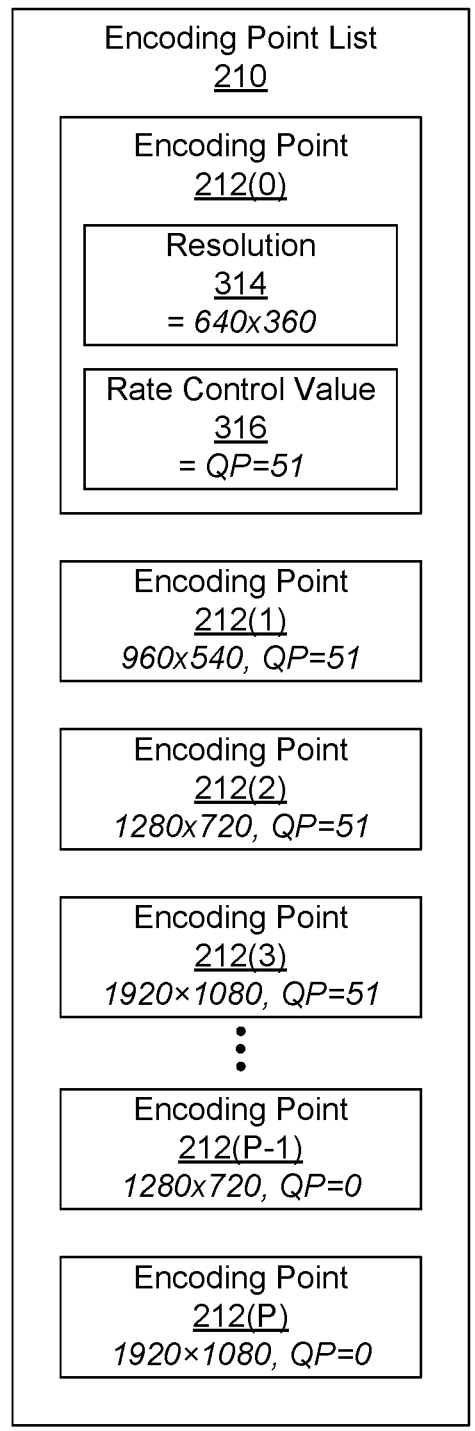
FIG. 3 is a more detailed illustration of the encoding point list of FIG. 2, according to various embodiments of the present invention.

FIG. 3 is a more detailed illustration of the encoding point list 210 of FIG. 2, according to various embodiments of the present invention. As shown, the encoding point list 210 includes any number of encoding points 212(0)-212(P). Each of the encoding points 212 includes, without limitation, a resolution 314 and a rate control value 316. The rate control value 316 may be a value for any parameter that specifies a tradeoff between bitrate and distortion level or quality during encoding. For instance, in some embodiments, the rate control value 316 is a value for a quantization parameter (QP) that allows a monotonic performance in terms of bitrate and distortion level when encoding video content. The higher the "QP," the lower the resulting bitrate at the expense of lower quality.

For explanatory purposes only, resolutions 314, and rate control values 316 for encoding points 212(0)-212(3), 212 (P−1), and 212(P) are depicted in italics. As shown, the encoding point 212(0) includes the resolution 314 of 640× 360 and the rate control value 316 QP=51. The encoding point 212(1) includes the resolution 314 of 960×540 and the rate control value 316 QP=51. The encoding point 212(2) includes the resolution 314 of 1280×720 and the rate control value 316 QP=51. The encoding point 212(3) includes the resolution 314 of 1920×1080 and the rate control value 316 QP=51. The encoding point 212(P−1) includes the resolution 314 of 1280×720 and the rate control value 316 QP=0. The encoding point 212(P) includes the resolution 314 of 1920×1080 and the rate control value 316 QP=0.

As the depicted exemplary encoding points 212 illustrate, any combination of the resolution 314 and the rate control value 316 may differ between any two encoding points 212. In general, the buffer-based encoding application 140 may acquire or generate the encoding list 210 in any technically feasible fashion. For instance, in some embodiments, the buffer-based encoding application 140 may generate the encoding list 210 based on permutations of eight resolutions 314 and all the rate control values 316 allowed by the encoding application 162. Advantageously, because of the wide variety of encoding points 212, the buffer-based encoding application 140 generates a wide variety of different encoded subsequences for each subsequence 132.

Figure 4:
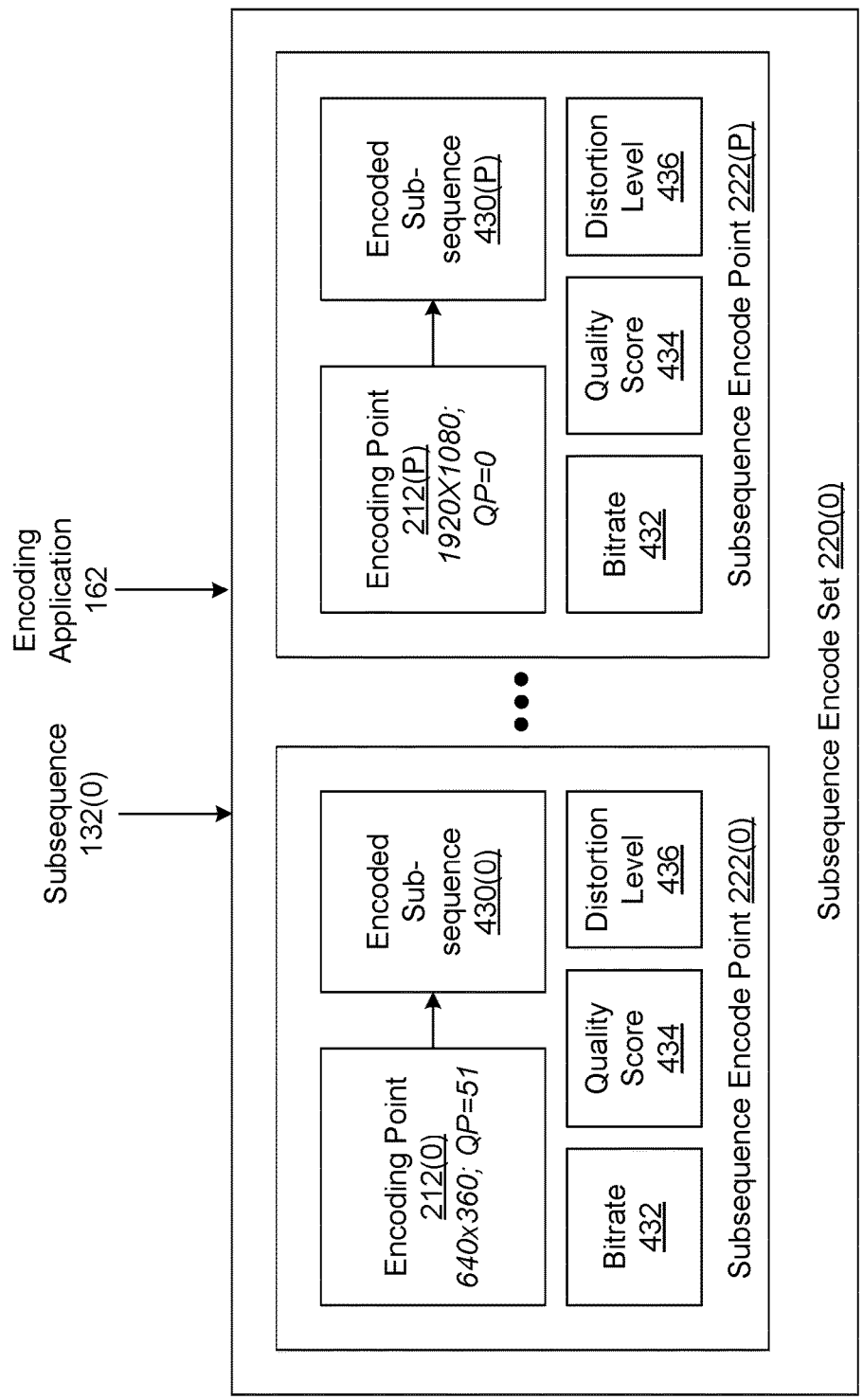
FIG. 4 is a more detailed illustration of one of the subsequence encode sets of FIG. 2, according to various embodiments of the present invention.

FIG. 4 is a more detailed illustration of one of the subsequence encode sets 220 of FIG. 2, according to various embodiments of the present invention. The subsequence encode set 220(0) is associated with the subsequence 132(0). As shown, the subsequence encode set 220(0) includes, without limitation, subsequence encode points 222(0)-222 (P). In general, the number of subsequence encode points 222 included in the subsequence encode set 220 is equal to the number of encoding points 212 included in the encoding point list 210. Further, the subsequence encode point 222(x) is associated with the encoding point 212(x).

Each subsequence encode point 212 includes, without limitation, the associated encoding point 212, an encoded subsequence 430, a bitrate 432 of the encoded subsequence 430, a quality score 434 of the encoded subsequence 430, and a distortion level 436 of the encoded subsequence 430. As described previously herein in conjunction with FIG. 2, the buffer-based encoding application 140 may generate the encoded subsequence 430 in any technically feasible fashion based on the associated encoding point 212 and the associated subsequence 132. Subsequently, the buffer-based encoding application 140 may determine the bitrate 432, the quality score 434, and the distortion level 436 in any technically feasible fashion based on the encoded subsequence 430. The quality score 434 may be the value for any quality metric.

For explanatory purposes only, exemplary values for the encoding point 212(0) included in the subsequence encode point 222(0) and the encoding point 212(P) included in the subsequence encode point 222(P) are depicted in italics. The encoding point 212(0) includes, without limitation, the resolution 314 of 640×360, and the rate control value 316 QP=51. Accordingly, the buffer-based encoding application 140 configures the encoding application 162 to encode the subsequence 132(0) at the resolution 314 of 640×360 and the rate control value 316 QP=51 to generate the encoded subsequence 430(0). By contrast, the encoding point 212(P) includes, without limitation, the resolution 314 of 1920×1080 and the rate control value 316 QP=0. Accordingly, the buffer-based encoding application 140 configures the encoding application 162 to encode the subsequence 132(0) at the resolution 314 of 1920×1080, and the rate control value 316 QP=0 to generate the encoded subsequence 430(P).

Figure 5:
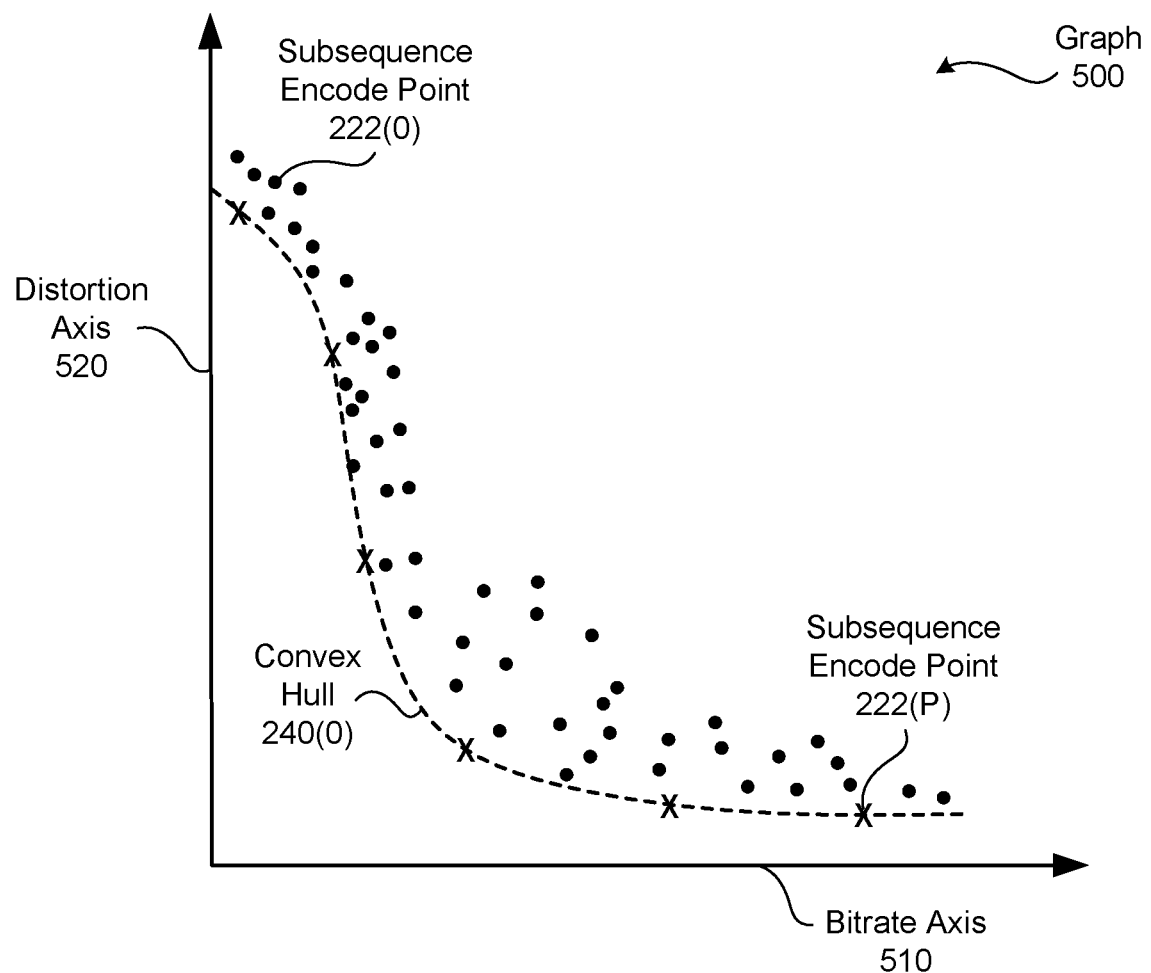
FIG. 5 illustrates an exemplary convex hull that is generated by the convex hull generator of FIG. 2, according to various embodiments of the present invention.

FIG. 5 illustrates an exemplary convex hull 240(0) that is generated by the convex hull generator 230 of FIG. 2, according to various embodiments of the present invention. In particular, the convex hull generator 230 generates the convex hull 240(0) based on the subsequence encode set 220(0). As shown, a graph 500 includes, without limitation, a bitrate axis 510 and a distortion axis 520.

In operation, for each of the subsequence encode points 222 included in the subsequence encode set 220(0) the convex hull generator 230 generates a corresponding plotted subsequence encode point 222 in the graph 500. The convex hull generator 230 plots a given subsequence encode point 222 by locating the bitrate 432 along the bitrate axis 510 and the distortion level 436 along the distortion axis 520. The convex hull generator 230 then evaluates the plotted subsequence encode points 222 to determine the convex hull 240(0).

More specifically, the convex hull generator 230 identifies the plotted subsequence encode points 222 that form a boundary where all the plotted subsequence encode points 222 reside on one side of the boundary (in this case, the right side of the boundary) and also are such that connecting any two consecutive identified plotted subsequence encode points 222 with a straight line leaves all remaining plotted subsequence encode points 222 on the same side. The convex hull 240(0) includes the set of the identified subsequence encode points 222.

For explanatory purposes only, the subsequence encode points 222 that are included the convex hull 240(0) are depicted as crosses in the graph 500, while the remaining subsequence encode points 222 are depicted as filled circles in the graph 500. In particular, the subsequence encode point 222(P) is included in the convex hull 240(0), while the subsequence encode point 222(0) is not included in the convex hull 240(0).

Persons skilled in the art will understand that many techniques for generating convex hulls are well known in the field of mathematics, and all such techniques may be implemented to generate the convex hulls 240. In one embodiment, the convex hull generator 230 applies machine-learning techniques to estimate the subsequence encode points 222 included in the convex hull 240 based on various parameters of the associated subsequence 132 and/or source media sequence 122. In this manner, some of the computations discussed thus far may be streamlined and/or avoided entirely.

Combining Different Encoded Subsequences

FIG. 6 is a more detailed illustration of one of the media encode points 270 of FIG. 2, according to various embodiments of the present invention. For explanatory purposes only, the media encode point 270(k) depicted in FIG. 6 is included in the global convex hull 260(i) that is associated with the subsequences 132(0)-132(i). As shown, the media encode point 270(k) includes, without limitation, a subsequence encode list 610, an encoded media sequence 630, an average bitrate 632, an overall distortion level 636, a current buffer occupancy 650, a minimum buffer occupancy 652, and a maximum buffer occupancy 654.

The subsequence encode list 610 includes, without limitation, encode selections 620(0)-620(i), where the number of encode selections 620 is equal to the number of subsequences 132 associated with the global convex hull 260(i). More specifically, the subsequence encode list 610 includes a different encode selection 620(x) for each subsequence 132(x) associated with the global convex hull 260(i). Each of the encode selections 620 specifies a different subsequence encode point 222. In general, the encode selection 620(x) specifies one of the subsequence encode points 222 included in the subsequence encode set 220(x) associated with the subsequence 132(x).

For explanatory purposes only, exemplary values for the encode selections 620(0), 620(1), and 620(i) are depicted in italics. The encode selection 620(0) specifies the subsequence encode point 222(5) in the subsequence encode set 220(0). The encode selection 620(1) specifies the subsequence encode point 222(0) in the subsequence encode set 220(1). The encode selection 620(i) specifies the subsequence encode point 222(P) in the subsequence encode set 220(i).

The encoded media sequence 630 includes, without limitation, the (i+1) encoded subsequences 430 included in the (i+1) subsequence encode points 222 specified in the subsequence encode list 610. The average bitrate 632 and the overall distortion level 636 specify, respectively, a bitrate of the encoded media sequence 630 and a distortion level of the encoded media sequence 630. The subsequence iterator 250(i) and/or the buffer-based encoding application 140 may determine the encoded media sequence 630, the average bitrate 632, and the overall distortion level 636 in any technically feasible fashion.

As described in conjunction with FIG. 2, the current buffer occupancy 650, the minimum buffer occupancy 652, and the maximum buffer occupancy 654 specify characteristics of an exemplary transmission buffer having a size equal to the buffer size 174. More precisely, the current buffer occupancy 650 specifies the number of bits that are stored in the exemplary transmission buffer when the encoded media sequence 630 is decoded for playback on the exemplary endpoint device. The minimum buffer occupancy 652 specifies the minimum of bits that are stored in the exemplary transmission buffer during streaming of the encoded media sequence 630 to the exemplary endpoint device. The maximum buffer occupancy 654 specifies the maximum of bits that are stored in the exemplary transmission buffer during streaming of the encoded media sequence 630 to the exemplary endpoint device.

FIG. 7 is a more detailed illustration of the subsequence iterator 250($i$) of FIG. 2, according to various embodiments of the present invention. In operation, the subsequence iterator 250($i$) generates the global convex hull 260($i$) based on the global convex hull 260($i$–1), the convex hull 240($i$) and the transmission buffer constraint 170. For explanatory purposes only, the global convex hull 260($i$–1) includes, without limitation V media encode points 270. As described in conjunction with FIG. 6, each of the media encode points 270 includes a different subsequence encode list 610. Accordingly, the global convex hull 260($i$–1) is associated with V subsequence encode lists 610. The convex hull 240($i$) includes, without limitation, A subsequence encode points 222. As shown, the subsequence iterator 250($i$) includes, without limitation, a combination engine 710, a filtering engine 730, and a global convex hull generator 750.

The combination engine 710 generates a media encode set 720 based on the global convex hull 260($i$–1), the convex hull 240($i$) and the transmission buffer constraint 170. First, the combination engine 710 combines each of the V subsequence encode lists 610 associated with the global convex hull 260($i$–1) with each of the A subsequence encode points 222 included in the convex hull 240($i$) to generate (A×V) new subsequence encode lists 610 To combine the subsequence encode list 610($x$) with the subsequence encode point 222($y$), the combination engine 710 appends the subsequence encode point 222($y$) to the subsequence encode list 610($x$) to generate a new subsequence encode list 610($z$). Notably, each of the subsequence encode lists 610 associated with the global convex hull 260($i$–1) is associated with the subsequences 132(0)-132($i$–1) and each of the subsequence encode points 222 included in the convex hull 240($i$) is associated with the subsequence 132($i$). Consequently, each of the new subsequence encode lists 610 is associated with the subsequences 132(0)-132($i$+1).

For each new subsequence encode list 610, the subsequence iterator 250($i$) generates a new media encode point 270 based on the subsequence encode list 610 and then adds the new media encode point 270 to the media encode set 720. More precisely, for the new subsequence encode list 610($z$), the subsequence iterator 250($i$) aggregates the different encoded subsequences 430 included in the subsequence encode points 222 specified in the subsequence encode list 610($z$) to generate the encoded media sequence 630($z$). Subsequently, the subsequence iterator 250($i$) computes the average bitrate 632($z$) and the overall distortion level 636($z$) based on the encoded media sequence 630($z$). The subsequence iterator 250($i$) may compute the average bitrate 632($z$) and the overall distortion level 636($z$) in any technically feasible fashion.

For instance, in some embodiments, the subsequence iterator 250($i$) weights the bitrate 432 of each of the encoded subsequences 430 included in the encoded media sequence 630($z$) by the associated duration to generate weighted bitrates. The subsequence iterator 250($i$) sums the weighted bitrates and then divides the resulting weighted sum by the total duration of the encoded media sequence 630($z$) to compute the average bitrate 632($z$). The subsequence iterator 250($i$) computes the overall distortion level 636($z$) in a similar fashion.

In alternative embodiments, the subsequence iterator 250($i$) computes the average bitrate 632($z$) based on the subsequence encode list 610($x$) and the subsequence encode point 222($y$) from which the subsequence encode list 610($z$) was derived. More precisely, the subsequence iterator 250($i$) weights the average bitrate 632($x$) associated with the subsequence encode list 610($x$) by the duration of the encoded media sequence 630($x$) to generate a weighted media bitrate. Similarly, the subsequence iterator 250($i$) weights the bitrate 432 included in the subsequence encode point 222($y$) by the duration of the encoded subsequence 430($y$) to generate a weighted subsequence bitrate. The subsequence iterator 250($i$) sums the weighted media bitrate and the weighted subsequence bitrate and then divides the resulting weighted sum by the total duration of the encoded media sequence 630($z$) to compute the average bitrate 632($x$). The subsequence iterator 250($i$) computes the overall distortion level 636($z$) in a similar fashion.

The subsequence iterator 250($i$) computes the current buffer occupancy 650($z$), the minimum buffer occupancy 652($z$), and the maximum buffer occupancy 654($z$) based on encoded media sequence 630($z$) and the transmission buffer constraint 170. The current buffer occupancy 650($z$) specifies the number of bits that are stored in an exemplary transmission buffer when the encoded media sequence 630($z$) is decoded for playback on the exemplary endpoint device. The minimum buffer occupancy 652($z$) and the maximum buffer occupancy 654($z$) specify, respectively, the minimum and maximum number of bits that are stored in the exemplary transmission buffer during streaming of the encoded media sequence 630($z$) to the exemplary endpoint device as per the transmission buffer constraint 170. The subsequence iterator 250($i$) may compute the current buffer occupancy 650($z$), the minimum buffer occupancy 652($z$), and the maximum buffer occupancy 654($z$) in any technically feasible fashion that is consistent with the transmission buffer constraint 170.

For instance, in some embodiments, the subsequence iterator 250($i$) first computes the current buffer occupancy 650($z$) based on the subsequence encode list 610($x$) and the subsequence encode point 222($y$) from which the new subsequence encode list 610($z$) was derived. More precisely, the subsequence iterator 250($i$) sets a number of drained bits equal to the number of encoded bits included in the encoded subsequence 430($y$) included in the subsequence encode point 222($y$). The subsequence iterator 250($i$) also sets a number of refilled bits count equal to the product of the transmission rate 172 and the playback duration of the encoded subsequence 430($y$). The subsequence iterator 250($i$) then subtracts the number of drained bits from the number of refilled bits to determine a subsequence delta.

The subsequence iterator 250($i$) sets a potential buffer occupancy equal to the sum of the subsequence delta and the current buffer occupancy 650($x$) associated with the subsequence encode list 610($x$). If the constraint type 176 is CBR VBV, then the subsequence iterator 250($i$) sets the current buffer occupancy 650($z$) equal to the potential buffer occupancy. If, however, the constraint type 176 is VBR VBV, then the subsequence iterator 250($i$) sets the current buffer occupancy 650($z$) equal to the minimum of the buffer size 174 and the potential buffer occupancy.

Subsequently, the subsequence iterator 250($i$) sets the minimum buffer occupancy 652($z$) equal to the minimum of the current buffer occupancy 650($z$) and the minimum buffer occupancy 652(x) associated with the subsequence encode list 610(x). In a complementary fashion, the subsequence iterator 250(i) sets the maximum buffer occupancy 654(z) equal to the maximum of the current buffer occupancy 650(z) and the maximum buffer occupancy 654(x) associated with the subsequence encode list 610(x).

In alternative embodiments, the subsequence iterator 250 may compute the current buffer occupancy 650, the minimum buffer occupancy 652, and the maximum buffer occupancy 654 in any technically feasible fashion and at any level of granularity. For instance, in some embodiments, the subsequence iterator 250(i) computes the current buffer occupancy 650 at a frame-level of granularity based on the following continuous-time function (1):

$$O(t) = O_0 + tR - \sum_{i=0}^{i\Delta T \le t} S_i \quad (1)$$

In function (1), O(t) is a buffer occupancy at the time t, $O_0$ is an initial buffer occupancy at a time of 0, t is a time; R is an average frame rate, $\Delta T$ is the time interval between consecutive displayed time (i.e., the inverse of the frame rate), and $S_i$ is the compressed frame size of the $i^{th}$ frame.

As shown, the filtering engine 730 generates a compliant media encode set 740 based on the media encode set 720 and the transmission buffer constraint 170. More precisely, the filtering engine 730 initializes the compliant media encode set 740 to an empty set. Subsequently, for each media encode point 270(z) included the media encode set 720, the filtering engine 730 determines whether the associated encoded media sequence 630(z) is compliant with the transmission buffer constraint 170. If the filtering engine 730 determines that the encoded media sequence 630(z) is compliant with the transmission buffer constraint 170, then the filtering engine 730 adds the media encode point 270(z) to the compliant media encode set 740. By contrast, if the filtering engine 730 determines that the encoded media sequence 630(z) is not compliant with the transmission buffer constraint 170, then the filtering engine 730 does not add the media encode point 270(z) to the compliant media encode set 740.

The filtering engine 730 may determine whether the encoded media sequence 630(z) is compliant with the transmission buffer constraint 170 in any technically feasible fashion. For instance, in some embodiments, the filtering engine 730 computes a buffer difference between the maximum buffer occupancy 654(z) and the minimum buffer occupancy 652(z). If the buffer difference does not exceed the buffer size 174, then the filtering engine 730 determines that the encoded media sequence 630(z) is compliant with the transmission buffer constraint 170. Otherwise, the filtering engine determines that the encoded media sequence 630(z) is not compliant with the transmission buffer constraint 170.

The global convex hull generator 750 performs convex hull operations across the media encode points 270 included in the compliant media encode set 740 to generate the global convex hull 260(i). In general, each of the media encode points 270 included in the global convex hull 260(i) minimizes the average bitrate 632 for a different overall distortion level 636. The global convex hull generator 750 may perform any number and type of convex hull operations in any technically feasible fashion to generate the global convex hull 260(i). Persons skilled in the art will understand that many techniques for generating convex hulls are well known in the field of mathematics, and all such techniques may be implemented to generate the global convex hull 260(i).

For instance, in some embodiments, for each of the media encode points 270 included in the compliant media encode set 740, the global convex hull generator 750 generates a corresponding plotted media encode point 270 in a graph (not shown). The global convex hull generator 750 plots a given media encode point 270 by locating the average bitrate 632 along the bitrate axis 510 and overall distortion level 636 along the distortion axis 520. The global convex hull generator 750 then evaluates the plotted media encode points 270 to determine the global convex hull 260(i).

More specifically, the global convex hull generator 750 identifies the plotted media encode points 270 that form a boundary where all the plotted media encode points 270 reside on one side of the boundary and also are such that connecting any two consecutive identified plotted media encode points 270 with a straight line leaves all remaining plotted media encode points 270 on the same side. Notably, if multiple plotted media encode points 270 are within a relatively smaller distance of each other relative to the graph, then the global convex hull generator 750 selects the media encode point 270 having the highest current buffer occupancy 650. The convex hull 260(i) includes the set of the identified media encode points 270.

Figure 8:
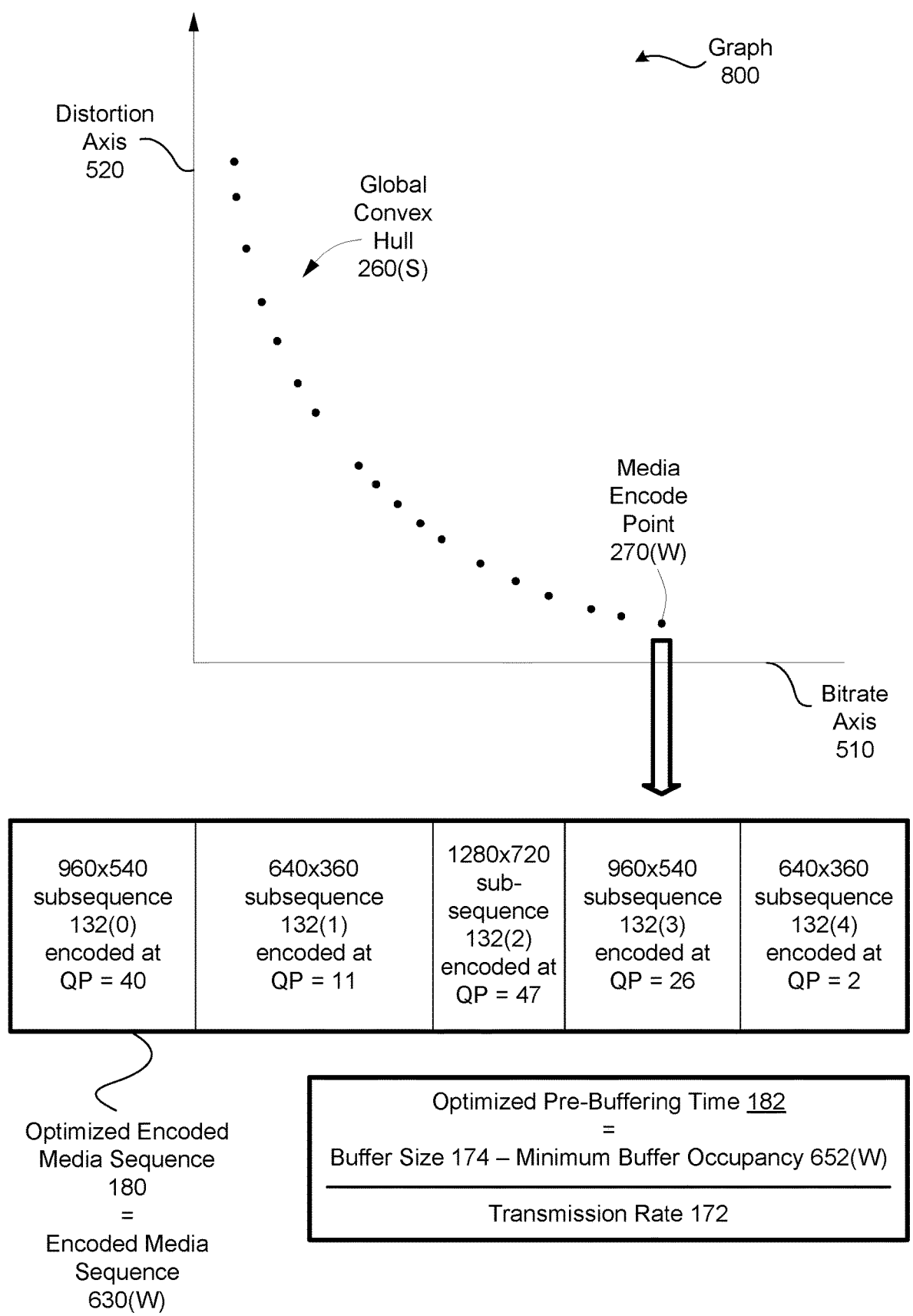
FIG. 8 illustrates an exemplary global convex hull and an exemplary optimized encoded media sequence that are generated by the buffer-based encoding application of FIG. 2, according to various embodiments of the present invention.

FIG. 8 illustrates an exemplary global convex hull 260(S) and an exemplary optimized encoded media sequence 180 that are generated by the buffer-based encoding application 140 of FIG. 2, according to various embodiments of the present invention. More specifically, the subsequence iterator 250(S) generates the global convex hull 260(S) of media encode points 270, where each media encode point is compliant with the transmission buffer constraint 170 and minimizes the average bitrate 632 for a different overall distortion level 636. For explanatory purposes, FIG. 8 depicts the media encode points 270 plotted as part of a graph 900 that includes, without limitation, the bitrate axis 510 and the distortion axis 520.

As described previously in conjunction with FIG. 2, the selection engine 290 determines the optimized encoded media sequence 180 based on the global convex hull 260(S) that is associated with all the subsequences 132(0)-132(S). More specifically, the selection engine 290 compares the average bitrates 632 of the media encode points 270 included in the global convex hull 260(S) and determines that the optimized media encode point 270(W) has the highest average bitrate 632. The selection engine 290 then sets the optimized encoded media sequence 180 equal to the encoded media sequence 630(W) included in the media encode point 270(W).

As persons skilled in the art will recognize, the optimized encoded media sequence 180 has a higher overall quality level than any other encoded media sequence 630 associated with the global convex hull 260(S). Consequently, the optimized media sequence 180 is an encoded version of the media title that both complies with the transmission buffer constraint 170 and optimizes the overall visual quality during playback of the media title on an endpoint device. In alternative embodiments, the selection engine 290 may select the optimized encoded media sequence 180 based on the global convex hull 260(S) and any number and type of criteria associated with any number and type of media metrics in any technically feasible fashion.

As shown, the optimized encoded media sequence 180 includes, without limitation, a 960×540 version of the subsequence 132(0) encoded at QP=40, followed by a 640×360 version of the subsequence 132(1) encoded at QP=11, followed by a 1280×720 version of the subsequence 132(2) encoded at QP=47, followed by a 960×540 version of the subsequence 132(3) encoded at QP=26, and ending with a 640×360 version of the subsequence 132(4) encoded at QP=2. Advantageously, as illustrated in FIG. 8, each of the resolution 314 and the rate control value 316 may vary across the subsequences 132 included in the optimized encoded media sequence 180.

For explanatory purposes only, the constraint type 176 associated with the exemplary global convex hull 260(S) is CRB VBV. Consequently, after the selection engine 290 determines the optimized encoded media sequence 180, the selection engine 290 computes the optimized pre-buffering time 182. As shown, the selection engine 290 sets an initial buffer occupancy equal to the difference between the buffer size 174 and the minimum buffer occupancy 652(W) included in the media encode point 270(W). The selection engine 290 then sets the optimized pre-buffering time 182 equal to the quotient of the initial buffer occupancy and the transmission rate 172. In alternative embodiments, the selection engine 190 may compute the optimized pre-buffering time 182 and/or an initial buffer occupancy in any technically feasible fashion.

Figure 9A:
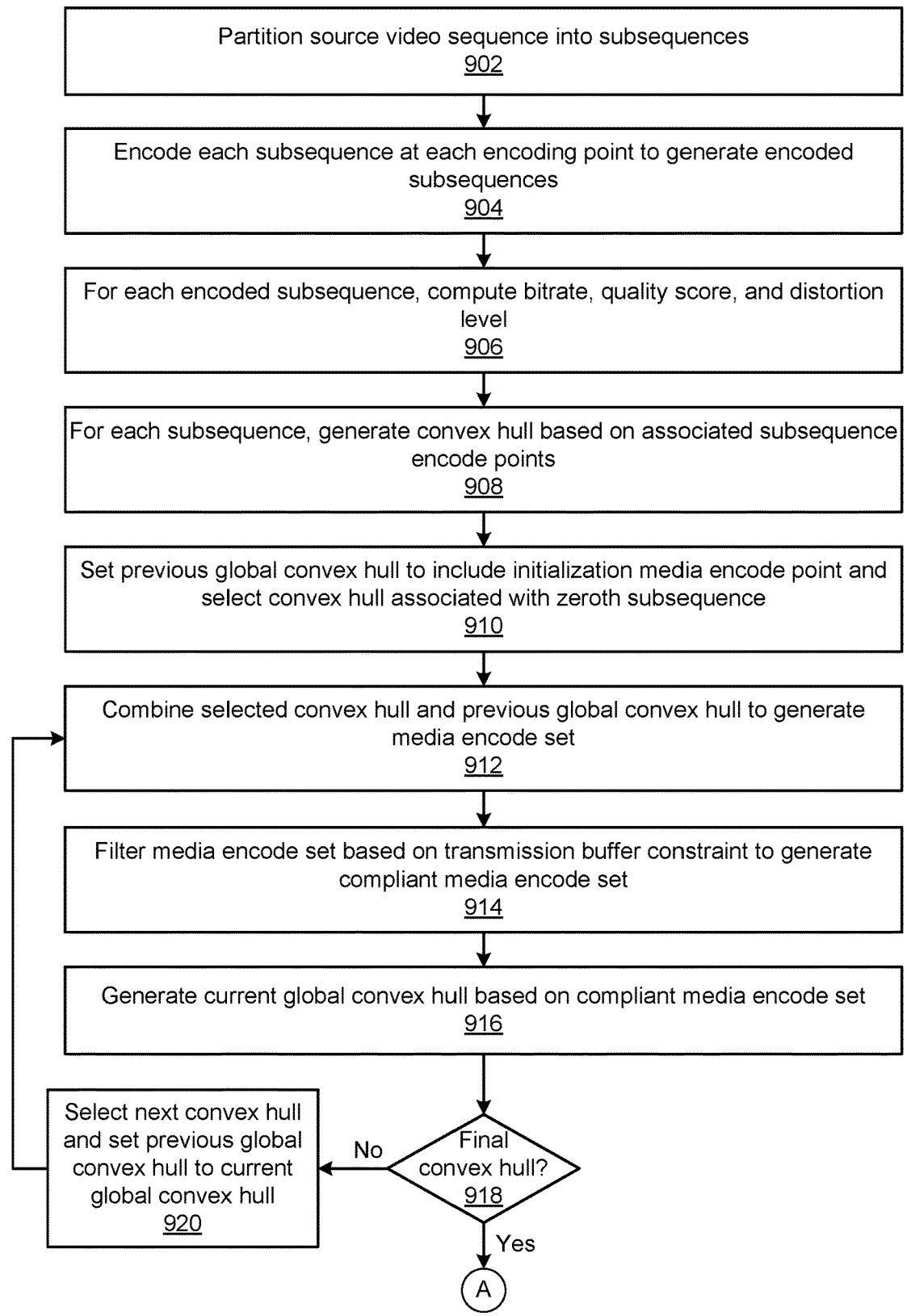
FIGS. 9A-9B set forth a flow diagram of method steps for encoding a source media title, according to various embodiments of the present invention.
Figure 9B:
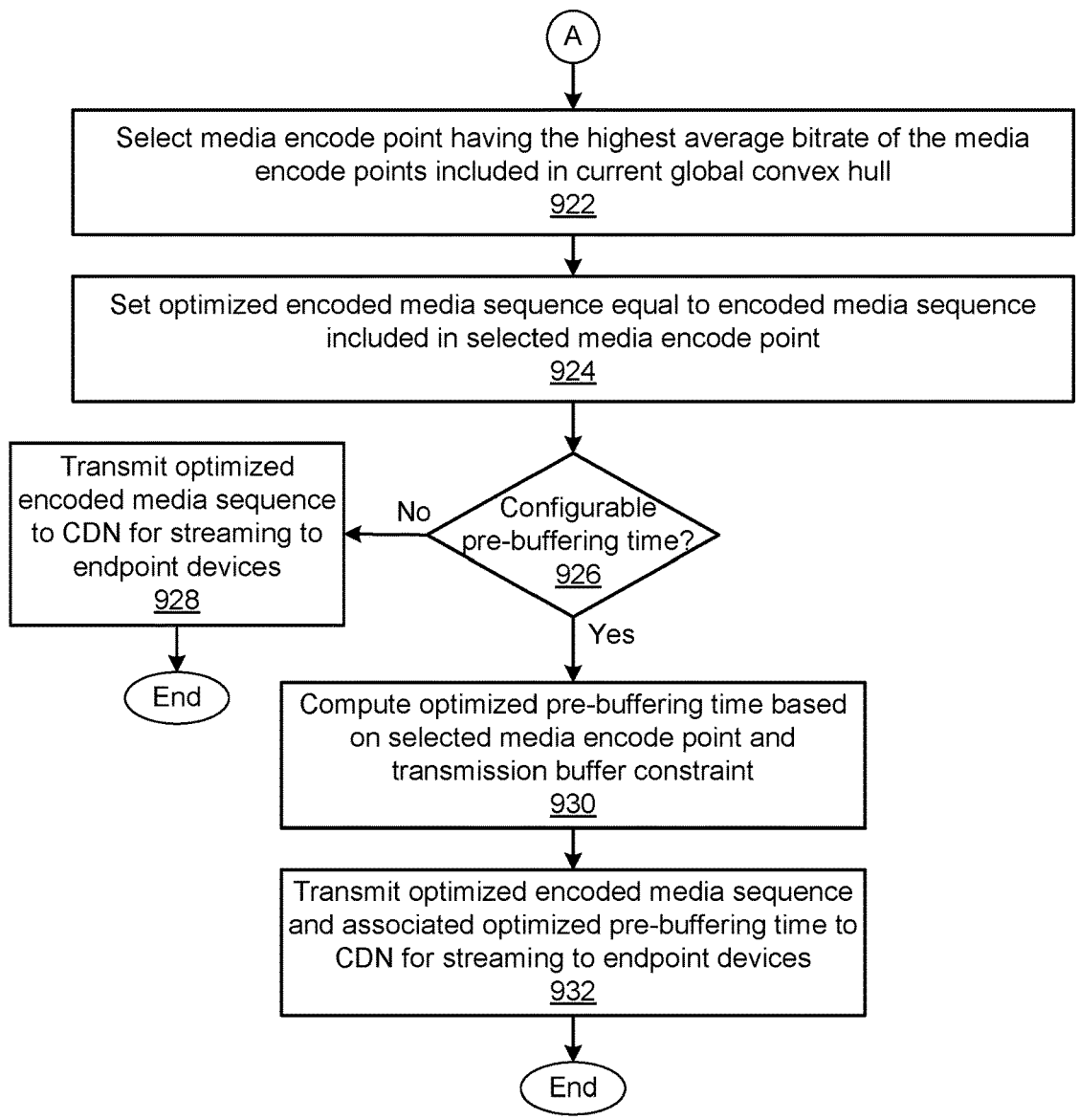

FIGS. 9A-9B set forth a flow diagram of method steps for encoding a source media title, according to various embodiments of the present invention. Although the method steps are described with reference to the systems of FIGS. 1-8, persons skilled in the art will understand that any system configured to implement the method steps, in any order, falls within the scope of the present invention.

As shown, a method 900 begins a step 902, where the subsequence analyzer 130 partitions the source media sequence 122 into the subsequences 132. At step 904, the buffer-based encoding application 140 encodes each of the subsequences 132 across each of the encoding points 212 included in the encoding point list 210 to generate the encoded subsequences 430. In alternative embodiments, each subsequence 132(x) may be associated with a different encoding point list 210(x). To generate the encoded subsequence 430 associated with both a particular subsequence 132(x) and a particular encoding point 212(y), the buffer-based encoding application 140 encodes the selected subsequence 132 at the associated resolution 314 and the associated rate control value 316.

At step 906, for each encoded subsequence 430, the buffer-based encoding application 140 computes the bitrate 432, the quality score 434, and the distortion level 436. As part of step 906, the buffer-based encoding application 140 generates a new subsequence encode point 222 that includes, without limitation, the encoding point 212, the encoded subsequence 430, the bitrate 432, the quality score 434, and the distortion level 436.

At step 908, for each subsequence 132(x), the convex hull generator 230 generates a different convex hull 240(x) based on the associated subsequence encode points 222. Notably, the resolutions 314 and the rate control values 316 may vary between the subsequence encode points 222 included in the convex hull 240(x). At step 910, the buffer-based encoding application 140 sets a previous global convex hull 260 to include a single initialization media encode point 270(−1) and selects the convex hull 240(0). The initialization media encode point 270(−1) includes, without limitation, the empty subsequence encode list 610, the NULL encoded media sequence 630, the current buffer occupancy 650 of the buffer size 174, the minimum buffer occupancy 652 of the buffer size 174, and the maximum buffer occupancy 654 of the buffer size 174.

At step 912, the combination engine 710 generates the media encode set 720 based on the previous global convex hull 260 and the selected convex hull 240. First, the combination engine 710 initializes the current media encode set 720 to an empty set. Subsequently, for each media encode point 270(x) included in the previous global convex hull 260, the combination engine 710 adds P new media encode points 270 to the media encode set 720, where P is the total number of subsequence encode points 222 included in the selected convex hull 240.

To generate the new media encode point 270 associated with both the subsequence encode point 222(y) and the media encode point 270(x), the combination engine 710 appends the subsequence encode point 222(y) to the subsequence encode list 610(x) included in the media encode point 270(x) to generate a new subsequence encode list 610. The new subsequence encode list 610 is included in the new media encode point 1370. The combination engine 710 then generates a new encoded media sequence 630 included in the media encode point 270 based on the new subsequence encode list 610. Finally, the combination engine 710 computes the average bitrate 632, the overall distortion level 636, the current buffer occupancy 650, the minimum buffer occupancy 652, and the maximum buffer occupancy 654 included in the new media encode point 270 based on the new encoded media sequence 630 and the transmission buffer constraint 170.

At step 914, the filtering engine 730 performs filtering operations on the media encode set 720 based on the transmission buffer constraint 170 to generate the compliant media encode set 740. More precisely, the filtering engine 730 removes the media encode points 270 included in the media encode set 740 for which the difference between the maximum buffer occupancy 654 and the minimum buffer occupancy 652 is greater than the buffer size 174. At step 916, the global convex hull generator 750 generates the current global convex hull 260 based on the compliant media encode set 740.

At step 918, the subsequence iterator 250 determines whether the selected convex hull 240 is the final convex hull 240(S) and, consequently, is associated with the final subsequence 132(S) included in the source media sequence 122. If, at step 918, the subsequence iterator 250 determines that the selected convex hull 240 is not the final convex hull 240(S), then the method 900 proceeds to step 920. At step 920, the subsequence iterator 250 selects the next convex hull 240 and sets the previous global convex hull 260 equal to the current global convex hull 260. The method 900 then returns to step 912, where the subsequence iterator 250 generates a new current global convex hull 260 based on the previous global convex hull 260 and the selected convex hull 240.

If, however, at step 918, the subsequence iterator 250 determines that the selected convex hull 240 is the final convex hull 240(S), then the method 900 proceeds directly to step 922. At step 922, the selection engine 290 selects the media encode point 270 having the highest average bitrate 632 of the media encode points 270 included in the current global convex hull 260. At step 924, the selection engine 290 sets the optimized encoded media sequence 180 equal to the encoded media sequence 630 included in the selected media encode point 270.

At step 926, the selection engine 290 determines whether the transmission buffer constraint 170 is associated with a configurable pre-buffering time. If, at step 926, the selection engine 290 determines that the transmission buffer constraint 170 is not associated with a configurable pre-buffering time, then the method 900 proceeds to step 928. At step 928, the selection engine 290 transmits the optimized encoded media sequence 180 to the content delivery network 190 for streaming to endpoint devices. The method 900 then terminates.

If, however, at step 926, the selection engine 290 determines that the transmission buffer constraint 170 is associated with a configurable pre-buffering time, then the method 900 proceeds directly to step 930. At step 930, the selection engine 290 computes the optimized pre-buffering time 182 based on the selected media encode point 270 and the transmission buffer constraint 170. At step 932, the selection engine 290 transmits the optimized encoded media sequence 180 and the optimized pre-buffering time 182 to the content delivery network 190 for streaming to endpoint devices. The method 900 then terminates.

In sum, the disclosed techniques enable efficient and optimal encoding of source media sequences to generate optimized encoded media sequences that are compliant with transmission buffer constraints. A subsequence-based encoding subsystem includes, without limitation, a subsequence analyzer and a buffer-based encoding application. Initially, the subsequence analyzer partitions a source media sequence into multiple subsequences. For each subsequence, the buffer-based encoding subsystem generates multiple encoded subsequences based on an encoding list. The encoding list includes, without limitation, any number of encoding points, where each encoding point specifies a different combination of a resolution and a rate control value.

For each encoded subsequence, the buffer-based encoding application generates a different subsequence encode point. Each subsequence encode point includes, without limitation, the associated encoded subsequence, the associated encoding point, a bitrate of the encoded subsequence, a quality score of the encoded subsequence, and a distortion level of the encoded subsequence. Subsequently, for each subsequence, a convex hull generator generates a convex hull that includes a subset of the subsequence encode points associated with the subsequence. In general, for a given subsequence, the subsequence encode points included in the associated convex hull minimize the bitrate for different distortion levels.

A subsequence iterator then iteratively processes the subsequences in a temporal playback order to generate a different global convex hull of media encode points for each subsequence. For the $n^{th}$ subsequence, the subsequence iterator computes an $n^{th}$ global convex hull of media encode points based on a transmission buffer constraint, an $(n-1)^{th}$ global convex hull of media encode points, and the $n^{th}$ convex hull of subsequence encode points associated with the $n^{th}$ subsequence. The transmission buffer constraint specifies, without limitation, a transmission rate, a buffer size, and a constraint type. Each media encode point includes, without limitation, a subsequence encode list, an encoded media sequence, an average bitrate, an overall distortion level, a current buffer occupancy, a minimum buffer occupancy, and a maximum buffer occupancy.

Each media encode point in the $n^{th}$ global convex hull is associated with a portion of the media title that spans from the $0^{th}$ subsequence to the $n^{th}$ subsequence. To generate the $n^{th}$ global convex hull, the subsequence iterator combines each of the V media encode points included in the $(n-1)^{th}$ global convex hull with each of the A subsequence encode points included in the $n^{th}$ convex hull to generate a media encode set that includes (V×A) media encode points. The subsequence iterator then performs filtering operations on the media encode set based on the transmission buffer constraint, the minimum buffer occupancies, and the maximum buffer occupancies to generate a compliant media encode set. Finally, the subsequence iterator generates the $n^{th}$ global convex hull that is a subset of the compliant media encode set based on the average bitrates and the overall distortion levels. In general, for the portion of the media title spanning from the $0^{th}$ subsequence to the $n^{th}$ subsequence, the media encode points included in the $n^{th}$ global convex hull minimize the average bitrate for different overall distortion levels.

After generating the final global convex hull that spans the entire media title, a selection engine included in the buffer-based encoding application selects one of media encode points included in the final global convex hull as the optimized media encode. The optimized media encode point has an average bitrate that is higher than the average bitrates of all other media encode points included in the final global convex hull. The selection engine then sets the optimized encoded media sequence equal to the encoded media sequence included in the optimized media encode point. If the constraint type is associated with a configurable pre-buffering time, then the selection engine computes an optimized pre-buffering time based on the buffer size and the minimum buffer occupancy included in the optimized media encode point. Finally, the selection engine transmits the optimized encoded media sequence and, optionally, the optimized pre-buffering time to a content delivery network for distribution to endpoint devices.

At least one advantage and technological advancement of the disclosed techniques is that encoded media sequences are incrementally generated in the playback order based on sets of individually encoded subsequences and the transmission buffer constraint. Aggregating subsequences encoded using different encoding points to generate the encoded media sequences reduces the encoding inefficiencies typically associated with prior-art monolithic encoding techniques. Further, excluding encoded media sequences that are not compliant with the transmission buffer constraint from the global convex hulls efficiently ensures that the optimized encoded media sequence is compliant with the transmission buffer constraint. As a result, the overall visual quality of the optimized encoded media sequence is increased without increasing the likelihood of playback interruptions attributable to transmission buffer limitations during playback of the media title on endpoint devices. These technical advantages provide one or more technological advancements over the prior art.

1. In some embodiments, a computer implemented method comprises generating a first convex hull of subsequence encode points based on a first set of encoding points and a first subsequence associated with a media title; generating a first global convex hull of media encode points based on a transmission buffer constraint, the first convex hull, and a second global convex hull of media encode points associated with a portion of the media title that occurs before the first subsequence in a playback order for the media title; selecting a first media encode point included in the first global convex hull based on a media metric; and determining a first encoded media sequence based on the first media encode point, wherein the first encoded media sequence is subsequently streamed to an endpoint device during playback of the media title.

2. The computer-implemented method of clause 1, wherein the transmission buffer constraint comprises a constant bitrate video buffer verifier (VBV) constraint or a variable bitrate VBV constraint.

3. The computer-implemented method of clauses 1 or 2, further comprising computing a pre-buffering time based on a minimum buffer occupancy associated with the first encoded media sequence and a buffer size associated with the transmission buffer constraint.

4. The computer-implemented method of any of clauses 1-3, wherein generating the first global convex hull comprises for each combination of a media encode point included in the second global convex hull and a subsequence encode point included in the first convex hull, generating a different media encode point included in a set of media encode points; performing one or more filtering operations on the set of media encode points based on the transmission buffer constraint to generate a set of compliant media encode points; and performing one or more convex hull operations across the set of compliant media encode points to generate the first global convex hull.

5. The computer-implemented method of any of clauses 1-4, wherein the media metric comprises a bitrate, and selecting the first media encode point comprises determining that a first average bitrate associated with the first media encode point is greater than average bitrates associated with all other media encode points included in the first global convex hull.

6. The computer-implemented method of any of clauses 1-5, wherein generating the first global convex hull comprises generating a second encoded media sequence based on a second media encode point included in the second global convex hull and a first subsequence encode point included in the first convex hull; computing a minimum buffer occupancy and a maximum buffer occupancy based on the second encoded media sequence and a transmission rate associated with the transmission buffer constraint; determining that a difference between the maximum buffer occupancy and the minimum buffer occupancy does not exceed a buffer size associated with the transmission buffer constraint; and in response to determining that the difference does not exceed the buffer size, adding a second media encode point associated with the second encoded media sequence to the first global convex hull.

7. The computer-implemented method of any of clauses 1-6, wherein generating the first convex hull comprises generating a first set of subsequence encode points based on the first set of encoding point and the first subsequence; determining a region that includes the first set of subsequence encode points; identifying a boundary associated with the region, wherein no subsequence encode points included in the first set of subsequence encode points are located on a first side of the boundary; and discarding all subsequence encode points included in the first set of subsequence encode points that are not located along the boundary.

8. The computer-implemented method of any of clauses 1-7, wherein each encoding point included in the first set of encoding points specifies a different combination of a resolution and a rate control value.

9. The computer-implemented method of any of clauses 1-8, further comprising partitioning a source media sequence associated with the media title into a plurality of subsequences based on a plurality of shot changes, wherein the plurality of subsequences includes the first subsequence.

10. The computer-implemented method of any of clauses 1-9, wherein the media title comprises at least one of video content and audio content.

11. In some embodiments, one or more non-transitory computer readable media include instructions that, when executed by one or more processors, cause the one or more processors to perform the steps of encoding a first subsequence associated with a media title across a first set of encoding points to generate a first set of subsequence encode points, wherein each subsequence encode point is associated with a different encoded subsequence; performing one or more convex hull operations across the first set of subsequence encode points to compute a first convex hull of subsequence encode points based on at least two media metrics; generating a first global convex hull of media encode points based on a transmission buffer constraint, the first convex hull, and a second global convex hull of media encode points associated with one or more subsequences associated with the media title that occur before the first subsequence in a playback order for the media title; selecting a first media encode point included in the first global convex hull based on a first media metric; and determining a first encoded media sequence based on the first media encode point, wherein the first encoded media sequence is subsequently streamed to an endpoint device during playback of the media title.

12. The one or more non-transitory computer readable media of clause 11, wherein the transmission buffer constraint specifies at least one of a transmission rate and a buffer size.

13. The one or more non-transitory computer readable media of clauses 11 or 12, further comprising computing a pre-buffering time based on a minimum buffer occupancy associated with the first encoded media sequence and a buffer size associated with the transmission buffer constraint.

14. The one or more non-transitory computer readable media of any of clauses 11-13, wherein generating the first global convex hull comprises generating a second media encode point based on a third media encode point included in the second global convex hull and a first subsequence encode point included in the first convex hull; generating a fourth media encode point based on the third media encode point and a second subsequence encode point included in the first convex hull; adding the second media encode point but not the fourth media encode point to a set of compliant encode points based on the transmission buffer constraint; and performing one or more convex hull operations across the set of compliant media encode points to generate the first global convex hull.

15. The one or more non-transitory computer readable media of any of clauses 11-14, wherein the first media metric comprises a bitrate, and selecting the first media encode point comprises determining that a first average bitrate associated with the first media encode point is greater than average bitrates associated with all other media encode points included in the first global convex hull.

16. The one or more non-transitory computer readable media of any of clauses 11-15, wherein generating the first global convex hull comprises generating a second encoded media sequence based on a second media encode point included in the second global convex hull and a first subsequence encode point included in the first convex hull; computing a minimum buffer occupancy and a maximum buffer occupancy based on the second encoded media sequence and a transmission rate associated with the transmission buffer constraint; determining that a difference between the maximum buffer occupancy and the minimum buffer occupancy does not exceed a buffer size associated with the transmission buffer constraint; and in response to determining that the difference does not exceed the buffer size, adding a second media encode point associated with the second encoded media sequence to the first global convex hull.

17. The one or more non-transitory computer readable media of any of clauses 11-16, wherein generating the first global convex hull comprises generating a set of compliant media encode points based on the transmission buffer constraint, the first convex hull, and the second global convex hull; determining a region that includes the set of compliant media encode points; identifying a boundary associated with the region, wherein no compliant media encode points included in the set of compliant media encode points are located on a first side of the boundary; and discarding all compliant media encode points included in the set of compliant media encode points that are not located along the boundary.

18. The one or more non-transitory computer readable media of any of clauses 11-17, wherein the first encoded media sequence includes a first encoded subsequence and a second encoded subsequence, and wherein the first encoded subsequence is associated with a first encoding point included in the first set of encoding points and the second encoded subsequence is associated with a second encoding point included in the first set of encoding points that is not equal to the first encoding point.

19. The one or more non-transitory computer readable media of any of clauses 11-18, wherein the first subsequence associated with the media title comprises a shot sequence.

20. In some embodiments, a system, comprises one or more memories storing instructions; and one or more processors that are coupled to the one or more memories and, when executing the instructions, are configured to partition a source media sequence associated with a media title into a plurality of subsequences based on a plurality of shot changes; generate a first convex hull of subsequence encode points based on a first set of encoding points and a first subsequence included in the plurality of subsequences, wherein each subsequence encode point is associated with a different encoded subsequence; generate a first global convex hull of media encode points based on a transmission buffer constraint, the first convex hull, and a second global convex hull of media encode points associated with a portion of the media title that occurs before the first subsequence in a playback order for the media title; select a first media encode point included in the first global convex hull based on a media metric; and determine a first encoded media sequence based on the first media encode point, wherein the first encoded media sequence is subsequently streamed to an endpoint device during playback of the media title.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method implemented by an endpoint device, the method comprising:
   receiving a first encoded media sequence of a media title that has been encoded based on an encode point included in a convex hull of encode points, wherein the convex hull of encode points is generated based on at least two other convex hulls of encode points associated with different portions of the media title and is filtered based on one or more transmission buffer constraints associated with the endpoint device;
   storing the first encoded media sequence in a transmission buffer included in the endpoint device; and
   decoding for playback at least a portion of the first encoded media sequence stored in the transmission buffer.

2. The method of claim 1, wherein the encode point minimizes an average bitrate subject to the one or more transmission buffer constraints.

3. The method of claim 1, wherein the one or more transmission buffer constraints include at least one transmission buffer constraint limiting a variation in bits used to encode frames included in the first encoded media sequence.

4. The method of claim 1, wherein the one or more transmission buffer constraints include at least one transmission buffer constraint associated with a pre-buffering time.

5. The method of claim 4, further comprising receiving the pre-buffering time.

6. The method of claim 4, wherein the pre-buffering time is based on an initial buffer occupancy and a transmission rate.

7. The method of claim 1, wherein the one or more transmission buffer constraints include at least one of a constant bitrate video buffer verifier (VBV) constraint or a variable bitrate VBV constraint.

8. The method of claim 1, wherein the first encoded media sequence comprises a plurality of subsequences, and at least two of the subsequences are encoded based on different encoding parameters and subject to the one or more transmission buffer constraints.

9. The method of claim 1, wherein the first encoded media sequence is associated with a media title comprising at least one of video content or audio content.

10. The method of claim 1, further comprising:
    receiving a second encoded media sequence that has been encoded based on at least a first encoding parameter and to comply with the one or more transmission buffer constraints, wherein the at least a first encoding parameters is different than at least one encoding parameter used to encode the first encoded media sequence; and
    storing the second encoded media sequence in the transmission buffer; and
    decoding for playback at least a portion of the second encoded media sequence.

11. The method of claim 1, wherein the at least two other convex hulls include a first convex hull of encode points corresponding to a first subsequence of the media title, and a second convex hull of encode points corresponding to a portion of the media title that occurs before the first subsequence in a playback order for the media title.

12. One or more non-transitory computer readable media including instructions that, when executed by one or more processors included in an endpoint device, cause the one or more processors to perform the steps of:
    receiving a first encoded media sequence of a media title that has been encoded based on an encode point included in a convex hull of encode points, wherein the convex hull of encode points is generated based on at least two other convex hulls of encode points associated with different portions of the media title and is filtered based on one or more transmission buffer constraints associated with the endpoint device;
    storing the first encoded media sequence in a transmission buffer included in the endpoint device; and
    decoding for playback at least a portion of the first encoded media sequence stored in the transmission buffer.

13. The one or more non-transitory computer readable media of claim 12, wherein the encode point minimizes an average bitrate subject to the one or more transmission buffer constraints.

14. The one or more non-transitory computer readable media of claim 12, wherein the one or more transmission buffer constraints include at least one of a transmission buffer constraint associated with a pre-buffering time or a transmission buffer constraint limiting a variation in bits used to encode frames included in the first encoded media sequence.

15. The one or more non-transitory computer readable media of claim 14, further comprising receiving the pre-buffering time.

16. The one or more non-transitory computer readable media of claim 14, wherein the pre-buffering time is based on an initial buffer occupancy and a transmission rate.

17. The one or more non-transitory computer readable media of claim 12, wherein the first encoded media sequence comprises a plurality of subsequences, and at least two of the subsequences are encoded based on different encoding parameters and subject to the one or more transmission buffer constraints.

18. The one or more non-transitory computer readable media of claim 12, the steps further comprising:
    receiving a second encoded media sequence that has been encoded based on at least a first encoding parameter and to comply with the one or more transmission buffer constraints, wherein the at least a first encoding parameters is different than at least one encoding parameter used to encode the first encoded media sequence; and
    storing the second encoded media sequence in the transmission buffer; and decoding for playback at least a portion of the second encoded media sequence.

19. The one or more non-transitory computer readable media of claim 12, wherein the first encoded media sequence is downloaded from a content distribution network.

20. The one or more non-transitory computer readable media of claim 12, wherein the first encoded media sequence comprises a real-time video stream.

21. An endpoint device, comprising:
one or more memories storing instructions; and
one or more processors that are coupled to the one or more memories and, when executing the instructions, are configured to:
receive a first encoded media sequence of a media title that has been encoded based on an encode point included in a convex hull of encode points, wherein the convex hull of encode points is generated based on at least two other convex hulls of encode points associated with different portions of the media title and is filtered based on one or more transmission buffer constraints associated with the endpoint device;
store the first encoded media sequence in a transmission buffer included in the endpoint device; and
decode at least a portion of first encoded media sequence stored in the transmission buffer for playback.

* * * * *